US011750003B2

(12) United States Patent
Matsushima et al.

(10) Patent No.: US 11,750,003 B2
(45) Date of Patent: Sep. 5, 2023

(54) INFORMATION PROCESSING DEVICE, INFORMATION PROCESSING SYSTEM, INFORMATION PROCESSING METHOD, AND COMPUTER PROGRAM

(71) Applicant: GS Yuasa International Ltd., Kyoto (JP)

(72) Inventors: Hitoshi Matsushima, Kyoto (JP); Tomikatsu Uchihori, Kyoto (JP); Hirofumi Imaizumi, Kyoto (JP); Tetsuro Matsumoto, Kyoto (JP); Keita Nakai, Kyoto (JP); Kayo Yamasaki, Kyoto (JP); Takuya Kitagawa, Kyoto (JP); Akira Kamata, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 117 days.

(21) Appl. No.: 16/954,944

(22) PCT Filed: Dec. 10, 2018

(86) PCT No.: PCT/JP2018/045225
§ 371 (c)(1),
(2) Date: Jun. 17, 2020

(87) PCT Pub. No.: WO2019/131078
PCT Pub. Date: Jul. 4, 2019

(65) Prior Publication Data
US 2020/0335990 A1 Oct. 22, 2020

(30) Foreign Application Priority Data
Dec. 25, 2017 (JP) .................................. 2017-248234
Dec. 25, 2017 (JP) .................................. 2017-248235
Dec. 25, 2017 (JP) .................................. 2017-248236

(51) Int. Cl.
*H02J 7/00* (2006.01)
*G06F 3/0482* (2013.01)
(Continued)

(52) U.S. Cl.
CPC .......... *H02J 7/0047* (2013.01); *G06F 3/0482* (2013.01); *H02J 7/00034* (2020.01); *H04L 67/025* (2013.01); *H02S 40/38* (2014.12)

(58) Field of Classification Search
CPC ... H02J 7/0047; H02J 7/00034; G06F 3/0482; H04L 67/025
See application file for complete search history.

(56) References Cited

U.S. PATENT DOCUMENTS 10,714,940 B2\* 7/2020 Takatsuka ............... H02S 10/00
2006/0152224 A1 7/2006 Kim et al.
(Continued)

FOREIGN PATENT DOCUMENTS

EP  1 770 844 A2  4/2007
EP  2 793 344 A1  10/2014
(Continued)

OTHER PUBLICATIONS

International Search Report (ISR) (PCT Form PCT/ISA/210), in PCT/JP2018/045225, dated Jan. 22, 2019.
(Continued)

*Primary Examiner* — Adnan Aziz
(74) *Attorney, Agent, or Firm* — McGinn I.P. Law Group, PLLC.

(57) ABSTRACT

An information processing device that transmits information on an energy storage device and a power supply-related device in response to a request from the outside or as an event includes, an acquisition unit that acquires information including a state of the energy storage device or the power supply-related device through communication; a storage
(Continued)

processing unit that stores the acquired information in a storage medium in association with information that identifies the energy storage device and the power supply-related device, respectively; and a transmission processing unit that transmits display information for collectively displaying the information stored in the storage medium for each system including the energy storage device and/or power supply-related device, or for each place where the energy storage device and/or power supply-related device is installed.

21 Claims, 20 Drawing Sheets

(51) Int. Cl.
*H04L 29/08* (2006.01)
*H04L 67/025* (2022.01)
*H02S 40/38* (2014.01)

(56) References Cited

U.S. PATENT DOCUMENTS

| | | | | |
|---|---|---|---|---|
| 2009/0243555 | A1* | 10/2009 | Tominaga | H02J 7/0013 |
| | | | | 320/162 |
| 2011/0057612 | A1* | 3/2011 | Taguchi | B60L 53/30 |
| | | | | 320/109 |
| 2011/0231159 | A1 | 9/2011 | Allert et al. | |
| 2012/0064923 | A1* | 3/2012 | Imes | F24F 11/58 |
| | | | | 455/457 |
| 2014/0336837 | A1* | 11/2014 | Kiuchi | H02J 13/00001 |
| | | | | 700/295 |
| 2015/0067079 | A1* | 3/2015 | Tanabe | H04L 51/28 |
| | | | | 709/206 |
| 2015/0372518 | A1 | 12/2015 | Toya et al. | |
| 2016/0027402 | A1* | 1/2016 | Yanazume | G06F 3/14 |
| | | | | 345/2.3 |
| 2016/0049819 | A1* | 2/2016 | Butler | H02J 7/0045 |
| | | | | 320/105 |
| 2017/0063146 | A1* | 3/2017 | Ceravalo | H02M 7/003 |
| 2017/0195951 | A1 | 7/2017 | Klein et al. | |
| 2017/0200240 | A1* | 7/2017 | Marinelli | H04L 41/0681 |
| 2017/0259690 | A1* | 9/2017 | Koga | H01M 10/46 |
| 2018/0375374 | A1* | 12/2018 | Ito | H02J 13/00016 |

FOREIGN PATENT DOCUMENTS

| | | |
|---|---|---|
| JP | 2002-287857 A | 10/2002 |
| JP | 2006-524332 A | 10/2006 |
| JP | 2009-110086 A | 5/2009 |
| JP | 2013-009531 A | 1/2013 |
| JP | 2013-070534 A | 4/2013 |
| JP | 2013-070612 A | 4/2013 |
| JP | 2014-072645 A | 4/2014 |
| JP | 2015-121520 A | 7/2015 |
| JP | 2015-181327 A | 10/2015 |
| JP | 2016-063722 A | 4/2016 |
| JP | 2016-145795 A | 8/2016 |
| JP | 2017-135920 A | 8/2017 |
| WO | WO 2015/160779 A1 | 10/2015 |
| WO | WO 2017/115457 A1 | 7/2017 |

OTHER PUBLICATIONS

Extended European Search Report dated Mar. 21, 2022 for European Patent Application No. 21215153.4-1202.

* cited by examiner

INFORMATION PROCESSING DEVICE, INFORMATION PROCESSING SYSTEM, INFORMATION PROCESSING METHOD, AND COMPUTER PROGRAM

TECHNICAL FIELD

One aspect of the present invention relates to an information processing device, an information processing system, an information processing method, and a computer program that present information on an energy storage device and a power supply-related device.

BACKGROUND ART

Energy storage devices are widely used in an uninterruptible power system, DC or AC power supplies included in stabilized power supplies, and the like. Moreover, the use of energy storage devices in large-scale systems for storing renewable energy or electric power generated by existing power generating systems is expanding.

In an uninterruptible power system, a stabilized power supply, or a power generating system, maintenance activities for energy storage devices are important. A technology has been proposed that allows a user or maintenance personnel of an energy storage device to remotely acquire the state of charge (SOC) of the energy storage devices included in these systems, or information about life prediction, via a server device.

For example, Patent Document 1 proposes a system that allows an operator to remotely view information on a predicted value of the deterioration rate of an energy storage device via a server device and a network.

In Patent Document 2, in order to reliably execute the replacement of the energy storage device in the uninterruptible power system, a system that notifies a user of the time of battery replacement based on a monitoring program via a service center and a network, and allows the user and an operator to exchange information using an email or the like is disclosed.

PRIOR ART DOCUMENTS

Patent Documents

Patent Document 1: JP-A-2015-121520
Patent Document 2: JP-A-2002-287857

SUMMARY OF THE INVENTION

Problems to be Solved by the Invention

As disclosed in Patent Documents 1 and 2, a system has been proposed and realized for a user or maintenance personnel to remotely grasp a state of an energy storage device itself or an apparatus using the energy storage device. However, a system capable of collectively presenting various information on the energy storage device and the power supply-related device has not been realized so far.

Energy storage devices such as lead-acid batteries or lithium ion batteries are increasingly applied to industrial applications other than in-vehicle applications (automobile applications, motorcycle applications). For example, energy storage devices may be installed in parallel in a solar power generating system. In this case, the energy storage devices are connected to a power conditioner. In a large-scale solar power generating system called mega solar, a large number of energy storage devices and power conditioners are installed and used. Also when realizing power peak-cut in a factory or a large-scale facility, a large number of energy storage devices and power conditioners are installed and used. Also in railway applications, a large number of energy storage devices and rectifiers that are DC or AC power supply devices are installed and used. The conventional maintenance support system does not assume a case where such a large number of energy storage devices and power supply-related devices are installed in a distributed power supply system or a business entity.

For maintenance management of a system including an energy storage device and a power supply-related device, although a conventional maintenance support system independently developed for each energy storage device or power supply-related device can be used, usage and display mode are not uniformized and maintenance management becomes complicated.

Along with the permeation of IoT (Internet of Things) into society, expectations are increasing for the realization of remote monitoring of energy storage devices and power supply-related devices and the realization of value-added services.

One aspect of the present invention has an object to provide an information processing device, an information processing system, an information processing method, and a computer program capable of comprehensively presenting information on an energy storage device and a power supply-related device.

Means for Solving the Problems

The information processing device according to the present disclosure transmits information on an energy storage device and a power supply-related device. The transmission of information is executed in response to a request from the outside or as an event. The information processing device includes: an acquisition unit that acquires information including a state of the energy storage device or the power supply-related device through communication; a storage processing unit that stores the acquired information in a storage medium in association with information that identifies the energy storage device and the power supply-related device, respectively; and a transmission processing unit that transmits display information for collectively displaying the information stored in the storage medium for each system including the energy storage device and/or power supply-related device, or for each place where the energy storage device and/or power supply-related device is installed.

It may be possible to manually (for example, by an operator) set which range of information on the energy storage device and/or the power supply-related device information is to be collectively displayed (for example, for each factory area, each office, each business site, or each business entity), or to set it automatically.

With the above configuration, information including the state of each of the energy storage device and the power supply-related device is collected by the information processing device, and is transmitted to other devices as display information for collective display for each system including the energy storage device and/or the power supply-related device, or for each place where the energy storage device and/or the power supply-related device is installed. In a system in which the energy storage device and the power supply-related device operate in association with each other, the states of the energy storage device and the power supply-related device are more efficiently grasped by displaying them collectively. In addition, by collectively displaying the states of different power-related monitoring targets, it becomes easy to perform maintenance of the entire system (including planned maintenance and preventive maintenance).

The energy storage device is preferably a rechargeable device such as a secondary battery such as a lead-acid battery or a lithium ion battery, or a capacitor. Apart of the energy storage device to be monitored may be a non-rechargeable primary battery. Display information for collectively displaying information on different types of energy storage devices such as a lead-acid battery and a lithium ion battery may be transmitted to the request source. The energy storage device may be an energy storage module in which a plurality of energy storage cells are connected or an energy storage module group in which a plurality of the energy storage modules are connected.

When the energy storage device is configured by connecting a plurality of modules each including a plurality of energy storage cells, the display information may be information for displaying the information in a hierarchical manner in association with each other based on the connection configuration of the energy storage device.

In a large-scale energy storage system, an energy storage device (domain) may be configured by further connecting in parallel a plurality of things (banks), the thing being obtained by connecting in series a plurality of energy storage modules each including a plurality of energy storage cells. By displaying various information including the state of the energy storage device according to the connection configuration, it becomes more efficient to grasp which bank, which module, and which cell require maintenance.

The display information may include connection information to a communication device provided in the energy storage device or the power supply-related device.

With the above configuration, the connection with the communication device provided in the energy storage device and the power supply-related device can be provided via the information processing device, and it is possible to remotely make an appropriate selection between state grasping of the entire system and individual state grasping of respective devices (the energy storage device and the power supply-related device).

The information processing system according to the present disclosure includes a plurality of communication devices provided in the energy storage device and the power supply-related device, and an information processing device capable of communication connection with the plurality of communication devices. The information processing device includes an acquisition unit that acquires information including a state of the energy storage device or the power supply-related device via the communication device, a storage processing unit that stores, in a storage medium, the acquired information in association with information that identifies the energy storage device and the power supply-related device, respectively, and a transmission processing unit that transmits, in response to a request or as an event, display information for collectively displaying the information stored in the storage medium for each system including the energy storage device and/or power supply-related device, or for each place where the energy storage device and/or power supply-related device is installed.

In the information processing method according to the present disclosure, the information processing device transmits information on the energy storage device and the power supply-related device in response to a request or as an event. Specifically, by using a plurality of communication devices provided in the energy storage device or the power supply-related device, information including the state of the energy storage device or the power supply-related device is acquired through communication, the acquired information is stored in a storage medium in association with information that identifies the energy storage device and the power supply-related device, respectively, and display information for collectively displaying the information stored in the storage medium for each system including the energy storage device and/or power supply-related device, or for each place where the energy storage device and/or power supply-related device is installed is transmitted.

A computer program according to the present disclosure causes a computer including a display unit to display information on an energy storage device and a power supply-related device. The computer program causes the computer to execute a step of requesting information on the energy storage device and power supply-related device for each system including the energy storage device and/or power supply-related device, or for each place where the energy storage device and/or power supply-related device is installed, and to execute a step of collectively displaying the information transmitted in response to the request for each system or for each place.

The power supply-related device may be any one or more of uninterruptible power system, a so-called power conditioner (inverter) that converts (or reverse-converts) direct current to alternating current, and a rectifier that converts alternating current to direct current or alternating current with different characteristics. The power supply-related device is preferably electrically connected to the energy storage device. A large-scale energy storage system includes a plurality of energy storage devices and a power conditioner, and may further include a rectifier. Information on the energy storage device and the power supply-related device is collectively displayed for each system or for each place (building, administrator, etc.) where the device is installed.

MODE FOR CARRYING OUT THE INVENTION

The present invention will be specifically described with reference to the drawings showing the embodiments.

First Embodiment

Figure 1:
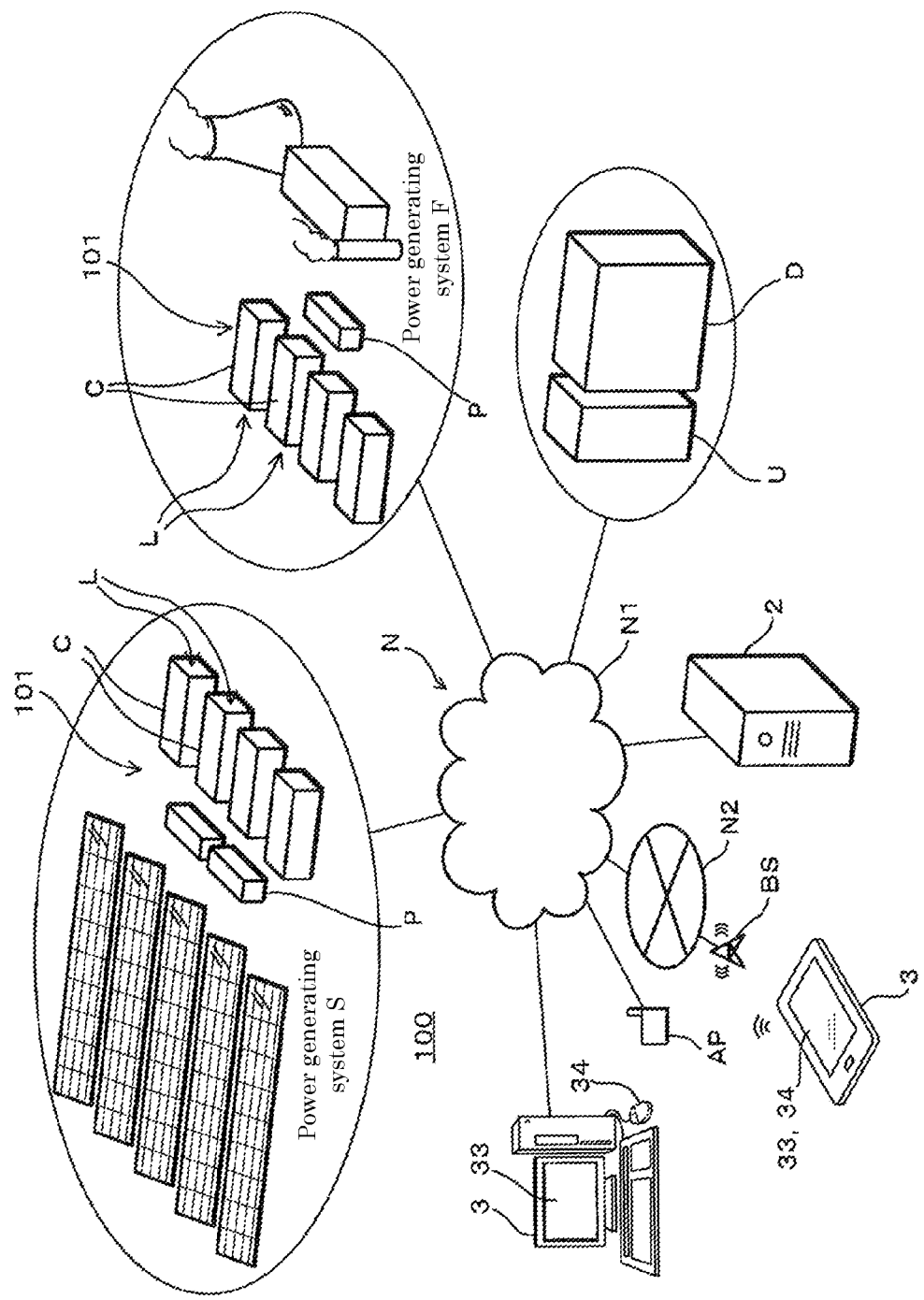
FIG. 1 is a diagram showing an outline of a monitoring system according to an embodiment.
Figure 2:
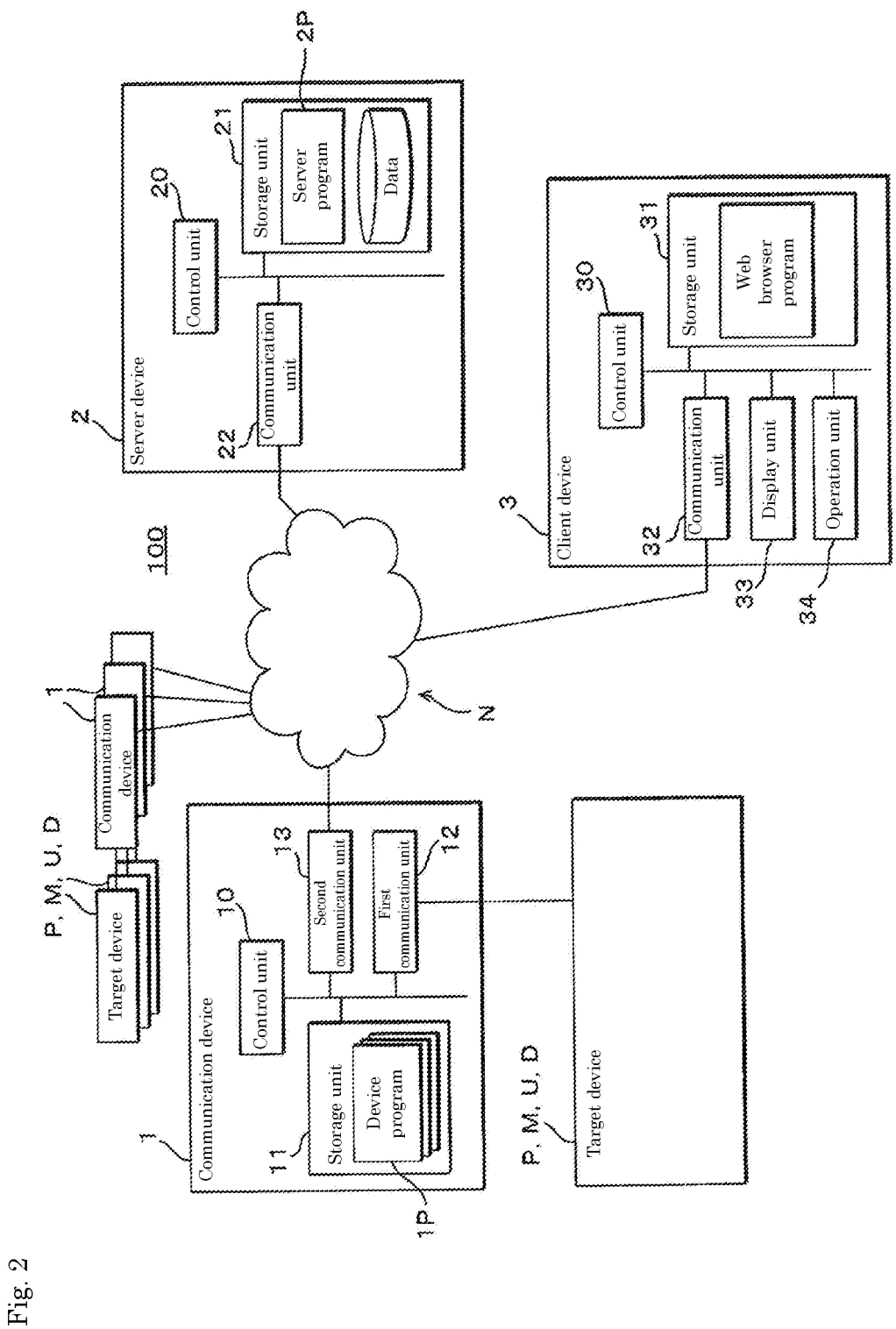
FIG. 2 is a block diagram showing a configuration of the monitoring system.

FIGS. 1 and 2 are diagrams showing an outline of a monitoring system 100 according to the present embodiment. The monitoring system 100 includes a communication device 1 mounted/connected to each system or device to be monitored, a server device 2 (information processing device) that collects information from the communication device 1, and a client device 3 that acquires the collected information. The server device 2 includes a Web server function, and presents information obtained by the communication device 1 mounted/connected to each device according to an access from the client device 3.

The communication device 1 is mounted in an energy storage system 101 that is respectively installed in a wind power generating system, a mega solar power generating system S, and a thermal power generating system F. Specifically, the communication device 1 is mounted/connected to each of a power conditioner (PCS) P and an energy storage module group L. The energy storage module group L is, for example, configured with a hierarchical structure of a bank in which a plurality of energy storage modules each including a plurality of lithium ion battery cells are connected in series and a domain in which a plurality of the banks are connected in parallel. A management device M (see FIG. 3) is provided for each bank and domain, and a communication device 1 is provided for the management device M of the domain. The energy storage system 101 is configured by arranging a plurality of containers C containing the energy storage module group L side by side.

The communication device 1 is also mounted in each of devices such as an uninterruptible power system (UPS) U and a rectifier (d.c. power supply or a.c. power supply) D arranged in a stabilized power supply system for railways and the like.

Figure 14:
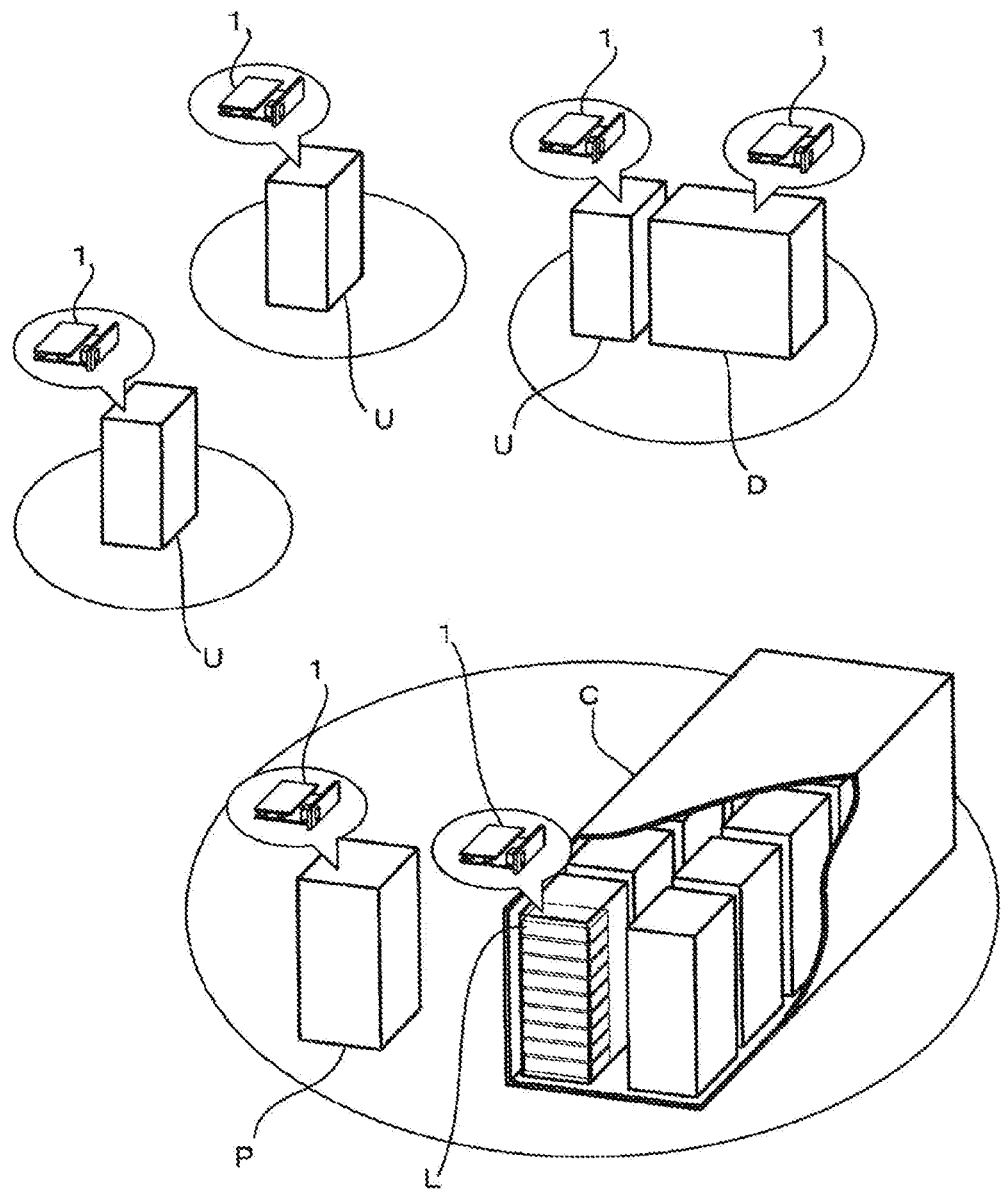
FIG. 14 is a schematic diagram showing an example of mounting a communication device.

In the monitoring system 100, the communication device 1 is mounted/connected to each power supply-related device in order for the server device 2 to collect information or the client device 3 to acquire information. FIG. 14 is a schematic diagram showing an example of mounting the communication device 1. The communication device 1 may be a terminal device (measurement monitor) that communicates with a battery management device (BMU) provided in an energy storage device and receives information on the energy storage device, or may be a network card type device that can be connected to the power supply-related device. The communication device 1 is also mounted/connected to a control unit of the uninterruptible power system U and to a control unit of the rectifier D that is a d.c. power supply or an a.c. power supply included in the stabilized power supply system. As described above, in the energy storage system 101, the communication device 1 is provided for each group of a plurality of energy storage modules in order to acquire information on the energy storage module group L. A plurality of power conditioners P are connected so that serial communication is possible, and the communication device 1 is mounted/connected to a control unit of any representative one of the power conditioners P.

Conventionally, for the amount of power generation of the power generating system S, F, the state (SOC, SOH: State Of Health) of the energy storage device in the energy storage system 101, and the state of UPS, etc., each device has a self-diagnosis function, and when an abnormality occurs, the abnormality is notified. In some cases, each self-diagnosis function notifies the server device, or the user or operator (maintenance personnel) using mail or the like via a connection unit that enables remote communication connection. However, they were performed independently of each device. On the other hand, in the monitoring system 100 of the present embodiment, the communication device 1 mounted or connected to each device is used, and in addition to the information such as the state of SOC or the like and the detected abnormality in the energy storage system 101, various pieces of information including the state of the power supply-related device are comprehensively presented so that the user or operator can confirm it.

The communication device 1 shown in FIG. 2 includes a controller 10, a storage unit 11, a first communication unit 12, and a second communication unit 13. The controller 10 is a processor using a CPU (Central Processing Unit), uses a built-in memory such as a ROM (Read Only Memory) and a RAM (Random Access Memory), and controls each component to execute processing.

The storage unit 11 uses a non-volatile memory such as a flash memory. The storage unit 11 stores a device program 1P that the controller 10 reads and executes. The device program 1P includes an embedded OS (Operating System) using Linux (registered trademark) or the like, a Web server running on the OS, and a communication program conforming to SSH (Secure Shell), SNMP (Simple Network Management Protocol), etc. The device program 1P may include a mailer program, and when an abnormality occurs, an electronic mail may be automatically transmitted to a preset mail address. These programs may be stored in a memory (ROM) built in the controller 10. The storage unit 11 stores information collected by the processing of the controller 10 and information such as an event log. The information stored in the storage unit 11 can also be read out via a communication interface such as USB whose terminals are exposed in the housing of the communication device 1.

The first communication unit 12 is a communication interface that realizes communication with a device (monitoring target device) in which the communication device 1 is mounted, and uses, for example, a serial communication interface such as RS-232C or RS-485. For example, each energy storage module included in the energy storage module group L may incorporate a control board having a communication function conforming to RS-232C, and the first communication unit 12 may communicate with a plurality of energy storage modules.

The second communication unit 13 is an interface that realizes communication via a network N, and uses a communication interface such as Ethernet (registered trademark) or a wireless communication antenna, for example. The controller 10 can be communicatively connected to the server device 2 via the second communication unit 13.

In the communication device 1 thus configured, the controller 10 acquires information obtained by the device in which the communication device 1 is mounted or connected via the first communication unit 12. The controller 10 can also read and execute a Web server program, receive a connection from the server device 2 or the client device 3 as a Web server, and present information. The controller 10 can receive a shutdown function remotely by SSH. The controller 10 functions as an SNMP agent by reading and executing the SNMP program, and can also respond to the information request from the server device 2.

Figure 3:
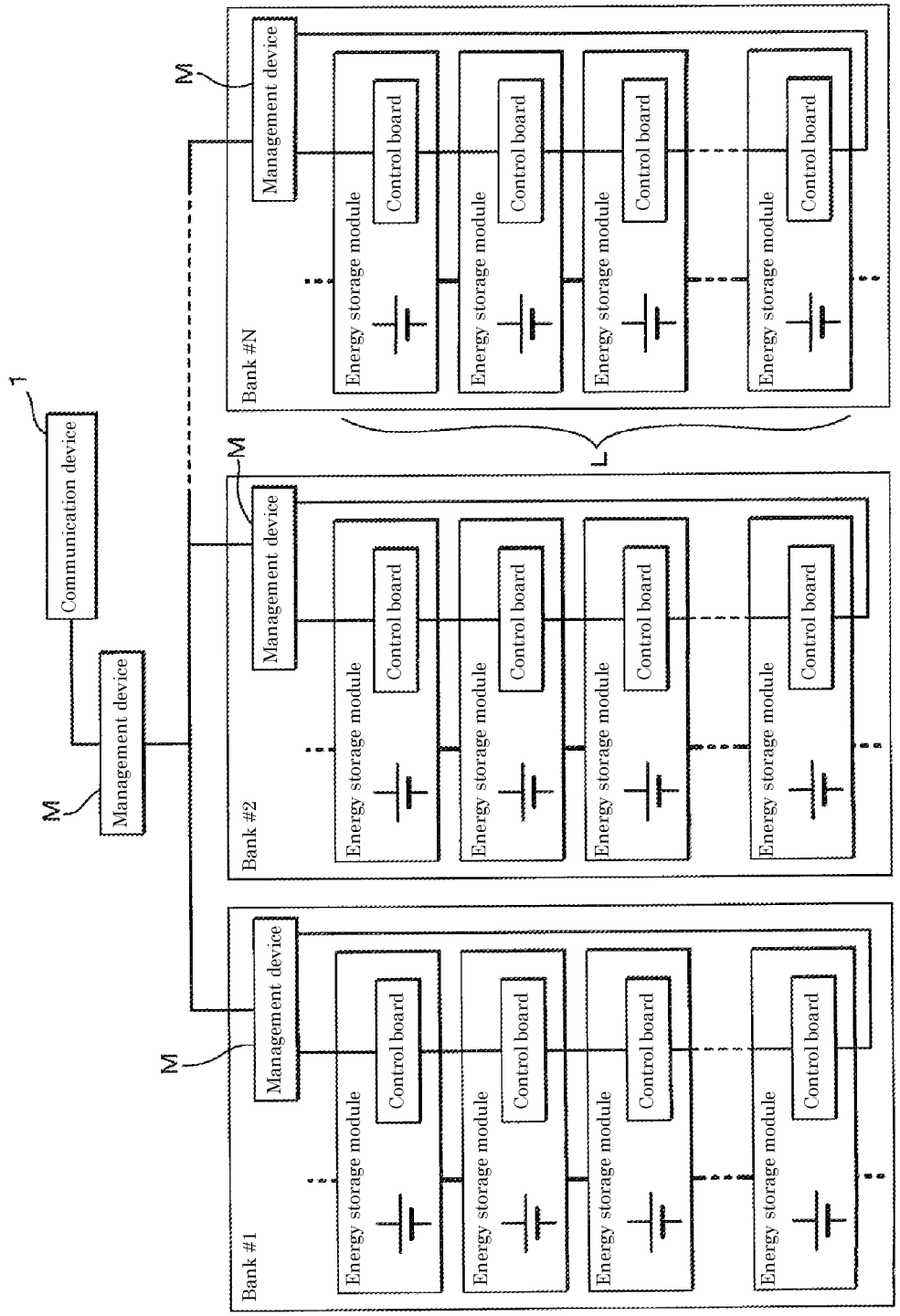
FIG. 3 is a diagram showing an example of a connection form of a communication device.

FIG. 3 is a diagram showing an example of a connection form of the communication device 1. FIG. 3 shows an example of connection between the communication device 1 and the management device M of the energy storage module group L. The management device M is provided for each of the banks numbered (#) 1 to N and for each domain in which the banks are connected in parallel. The management device M provided for each bank communicates by serial communication with a control board (CMU: Cell Monitoring Unit) with a communication function, which is incorporated in each energy storage module, and performs management processing, such as acquisition of the state (current, voltage, temperature) of the energy storage module and the internal cell, balance adjustment for each bank according to each state, and detection of abnormality in a communication state. Each management device M of the bank transmits the information on the energy storage module of each bank to the management device M provided for each domain. The management device M of the domain aggregates information obtained from the management devices M of the banks belonging to the domain. The communication device 1 can collect such information from the management device M for each domain and provide it to the server device 2 or the client device 3.

The server device 2 shown in FIG. 2 uses a server computer and includes a controller 20, a storage unit 21, and a communication unit 22. In the present embodiment, the server device 2 is described as one server computer, but it may have a configuration in which processing is distributed among a plurality of server computers.

The controller 20 is a processor using a CPU, uses a built-in memory such as ROM and RAM, and controls each component to execute processing. The controller 20 executes information processing based on a server program 2P stored in the storage unit 21. The server program 2P includes a Web server program, and the controller 20 functions as a Web server that performs provision of a Web page to the client device 3, reception of login to the Web service, and the like. The controller 20 collects information from the communication device 1 by http/https communication based on the server program 2P.

The storage unit 21 uses a non-volatile memory such as a hard disk or a flash memory. The storage unit 21 stores the server program 2P described above, and also stores data including states of the power conditioner P, the energy storage module group L, the uninterruptible power system U, and the rectifier D to be monitored, the states being collected by the processing of the controller 20.

The communication unit 22 is a communication device that realizes communication connection and data transmission/reception via the network N. Specifically, the communication unit 22 is a communication device compatible with a dedicated line and a general optical line.

The client device 3 is a computer used by an operator such as an administrator of the energy storage system 101 of the power generating system S, F, an administrator of the stabilized power supply system, or a maintenance personnel of the uninterruptible power system U. The client device 3 may be a desktop or laptop personal computer, or a so-called smartphone or tablet-type communication terminal. The client device 3 includes a controller 30, a storage unit 31, a communication unit 32, a display unit 33, and an operation unit 34.

The controller 30 is a processor using a CPU. The controller 30 causes the display unit 33 to display a Web page provided by the server device 2 or the communication device 1 based on a Web browser program stored in the storage unit 31.

The storage unit 31 uses a non-volatile memory such as a hard disk or a flash memory. The storage unit 31 stores various programs including a Web browser program.

The communication unit 32 uses a communication device such as a network card for wired communication, a wireless communication device for mobile communication connected to a base station BS (see FIG. 1), or a wireless communication device compatible with connection to an access point AP. The controller 30 can perform communication connection or information transmission/reception with the server device 2 or the communication device 1 via the network N by the communication unit 32.

The display unit 33 uses a display such as a liquid crystal display or an organic EL (Electro Luminescence) display. The display unit 33 displays an image of a Web page provided by the server device 2 by the processing based on the Web browser program of the controller 30. The display unit 33 is preferably a display with a built-in touch panel, but may be a display without a built-in touch panel.

The operation unit 34 is a user interface such as a keyboard and a pointing device capable of inputting/outputting with the controller 30 or a voice input unit. The operation unit 34 may use the touch panel of the display unit 33 or a physical button provided on the housing. The operation unit 34 notifies the controller 20 of operation information by the user.

As shown in FIG. 1, the network N includes a public communication network N1 which is so-called the Internet and a carrier network N2 which realizes wireless communication according to a predetermined mobile communication standard. The public communication network N1 includes a general optical line, and the network N includes a dedicated line connected to the server device 2. The carrier network N2 includes a base station BS, and the client device 3 can communicate with the server device 2 from the base station BS via the network N. An access point AP is connected to the public communication network N1, and the client device 3 can also transmit/receive information to/from the server device 2 from the access point AP via the network N.

The monitoring system 100 thus configured acquires, in the server device 2, periodically or in response to a request from the client device 3, various information including the states of the power conditioner P, the energy storage module group L, the uninterruptible power system U, and the rectifier D, and stores it in the storage unit 21. The storage unit 21 stores the information that identifies the device (P, M, U, D) from which the information is acquired and the acquired time information in association with each other. The latest data and its history stored in the storage unit 21 are processed by the server device 2 so that the latest data and its history can be acquired from the client device 3 as a Web page or data (download). Therefore, the server device 2 can comprehensively present the information acquired from the energy storage device or each power supply-related device using the communication device 1 to the client device 3.

Figure 4:
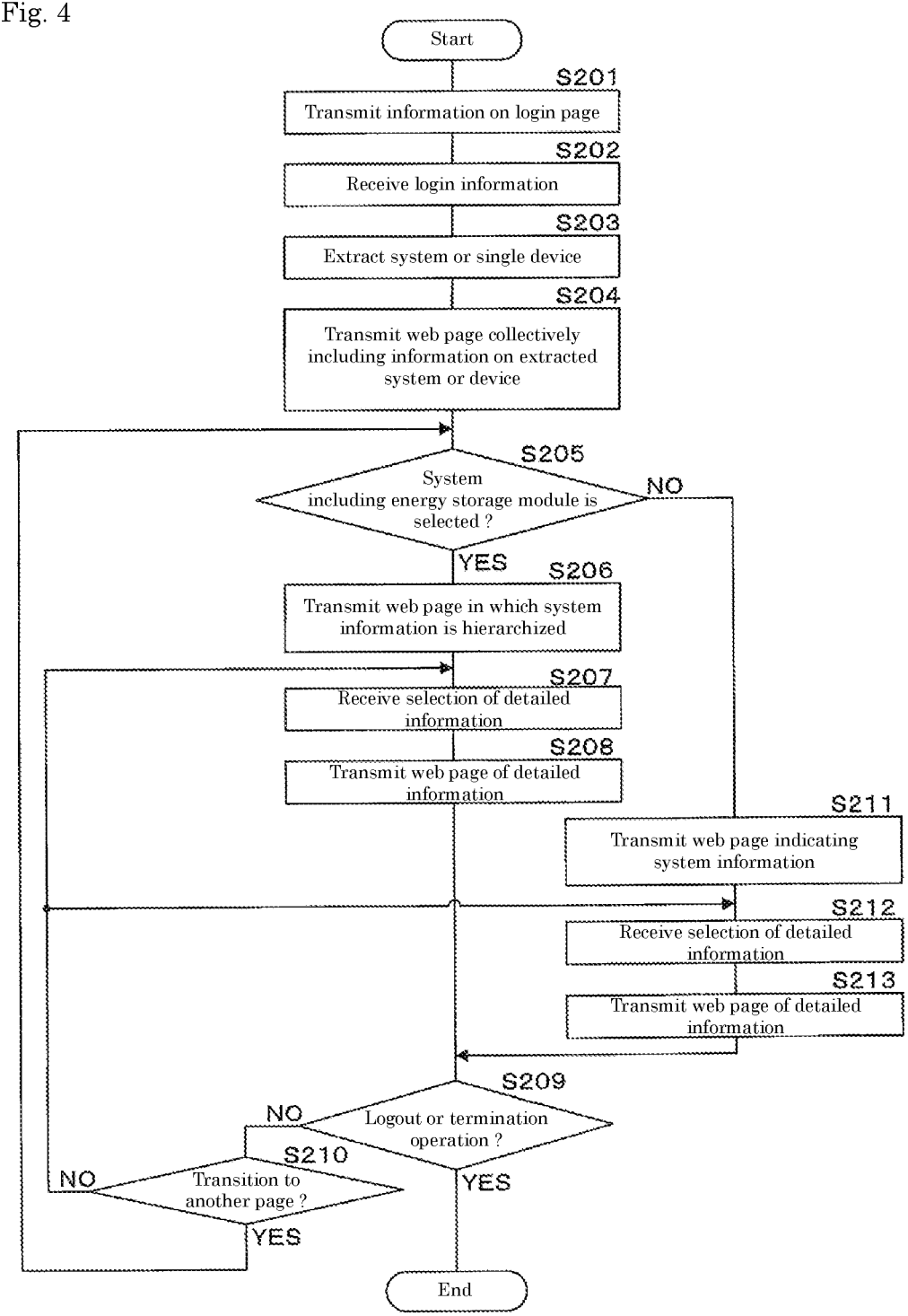
FIG. 4 is a flowchart showing an example of an information presentation processing procedure in a server device.

FIG. 4 is a flowchart showing an example of an information presentation processing procedure in the server device 2. The server device 2 acquires the information when the abnormality is detected and the information on the states at each time point from the respective controllers of the management device M, the power conditioner P, the uninterruptible power system U, and the rectifier D, which are arranged in the energy storage module group L via the communication device 1 that can be connected in a predetermined cycle, and sequentially stores these information as data in the storage unit 21. Then, the controller 20 of the server device 2, when having received a login request from the client device 3, starts the following processing. At a regular timing or at a timing when a system state change is detected, the controller 20 may provide a notification to prompt the login to the client device 3 as an event and transmit a login page.

As the Web server, the controller 20 transmits information on the login page for receiving the login information in the client device 3 to the client device 3 (step S201). Based on the operation on the operation unit 34 on the login screen displayed on the display unit 33 of the client device 3, the controller 20 receives the login information (step S202).

Based on the received login information, the controller 20 extracts identification information of the system or the single device having the access right stored in association with the login information (step S203). The controller 20 transmits, to the client device 3, information on a Web page that collectively includes link information to other Web pages for displaying information on each system or device corresponding to the extracted identification information (step S204). The list of link information included in the Web page transmitted at this time is a list shown in a system (location) unit that uses the energy storage module group L, the power conditioner P, the uninterruptible power system U, and the rectifier D without distinguishing them. This allows the operator (maintenance personnel) who uses the client device 3 to collectively check the state of the energy storage module group L and the states of the uninterruptible power system U and the like in a comprehensive manner. If there is a single system or single device having the access right associated with the login information, in step S204, the information for displaying the Web page for the single system or single device is transmitted to the client device 3 (S206 or S211).

The controller 20 determines whether or not the link to the system including the energy storage module group L is selected on the Web page displayed on the client device 3 based on the information transmitted in step S204 (step S205). When it is determined that the link to the system including the energy storage module group L is selected (S205: YES), the controller 20 transmits a Web page in which the information on the system is hierarchized to the client device 3 (step S206). The hierarchized Web page is a page that matches the hierarchical structure of the energy storage module group L, and it is possible to select, for example, a domain, a bank, and an energy storage module in that order, and the lower layer can be selected according to the selection. The hierarchical structure of each system is determined by a connection mode of the device in which the communication device 1 is provided. These display examples will be described in detail in screen examples described later.

The controller 20 receives a selection of detailed information of a hierarchy corresponding to a single energy storage module or a management device M included in the system in the Web page of the information of the system including the energy storage module group L (step S207). When the detailed information is selected, the controller 20 transmits, as the detailed information, a Web page indicating the state (configuration, total voltage, SOC, temperature, etc.) in the hierarchy to the client device 3 (step S208). In step S208, link information to the Web server of the communication device 1 of the corresponding hierarchy may be transmitted to the client device 3 as other detailed information (S208). As described above, from the Web server of the communication device 1, it is possible to acquire a Web page that presents information that can be acquired by the device to which the communication device 1 is mounted/connected.

After that, the controller 20 determines whether or not a logout operation or a Web browser termination operation has been performed in the client device 3 (step S209), and when it is determined that the operation has been performed (S209: YES), terminates the processing.

When it is determined that the logout operation or the Web browser termination operation has not been performed (S209: NO), the controller 20 determines whether or not the instruction to transition to another page has been received (step S210). When it is determined that the instruction to transition to another page has been received (S210: YES), the controller 20 returns the processing to step S205, and transmits the page of another system or the like according to the operation from the Web browser. When it is determined that the instruction to transition to another page has not been received (S210: NO), the controller 20 returns the processing to step S207. While the selection of the detailed information has not been received, the Web page of the information of the system including the energy storage module group L remains displayed.

At this time, the other page of the transition destination may include a link to a Web page for outputting the log information, the statistical information, and the life prediction of the energy storage module included in the system that are processed and stored in association with each system. In addition, a management page for editing of login information, editing of devices included in the system, and the like may be included.

When it is determined in step S205 that the link to the system including the energy storage module group L has not been selected (S205: NO), the controller 20 transmits, to the client device 3, information on a Web page for displaying information on a system using any one or more of the power conditioner P, the uninterruptible power system U, or the rectifier D (step S211).

The controller 20 receives a selection of detailed information for any one or more of the power conditioner P, the uninterruptible power system U, and the rectifier D included in the selected system (step S212). The controller 20 transmits a Web page indicating the state (parameters such as configuration, current value, and voltage value) of the selected device to the client device 3 (step S213), and advances the processing to step S209. Also in step S213, link information to the Web server of the communication device 1 corresponding to the selected system or device as other detailed information may be transmitted to the client device 3 (S213). After the processing of step S213, when it is determined in step S210 that the instruction to transition to another page has not been received (S210: NO), the controller 20 returns the processing to step S212. While the selection of the detailed information has not been received in step S212, the Web page of the information on the selected system remains displayed.

Figure 5:
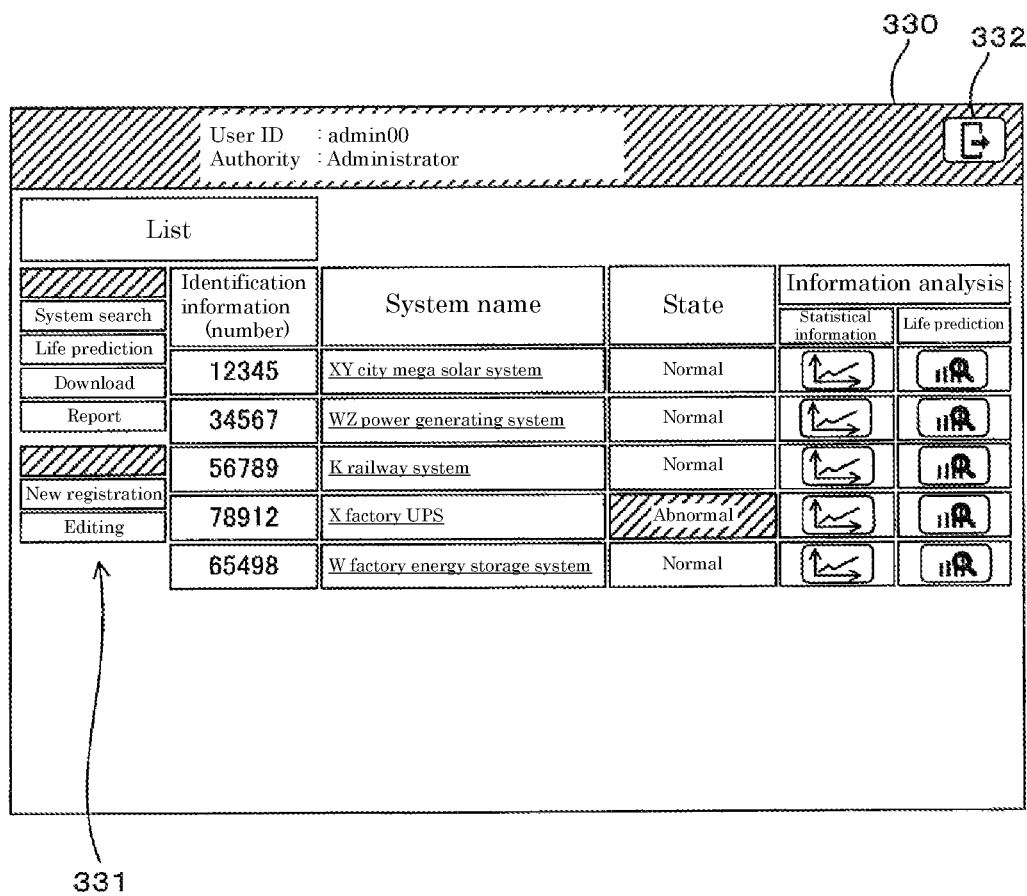
FIG. 5 is a diagram showing an example of a screen displayed after login.

The display processing of FIG. 4 will be specifically described using the screen examples shown in FIGS. 5 to 10. FIG. 5 is a diagram showing an example of a screen displayed after login. FIG. 5 shows a Web screen 330 (screen displayed on the display unit 33 of the client device 3) including a list of system or device names extracted by the login information in step S204. In the example of FIG. 5, the name of the mega solar power generating system S "XY city mega solar system" and the name of the thermal power generating system F "WZ power station system", which are shown in FIG. 1, and "K railway system", "X factory UPS" and the like are displayed as links together with identification information, respectively. On the Web screen of the list, the current state (normal/abnormal) of each system, a graph of measurement parameters in each system, and icons for outputting the life prediction of the energy storage modules used in the system are included for the purpose of current status understanding/information analysis.

The Web screen 330 displayed based on the Web page provided from the server device 2 includes a menu 331 of "system search", "life prediction", "download", "report", and the like. When "system search" is selected from the menu 331, a page (FIG. 5) including a list of link information to each information of the system or the single device having the access right is displayed. When "life prediction" is selected by the operation of the operation unit 34 of the client device 3, a page for receiving execution of the life prediction of the energy storage device in the selected system is displayed. When "download" is selected, a page for collectively acquiring the state of each device and each energy storage module group L included in the selected system as a file in a predetermined format is displayed. When "report" is selected, a page for acquiring the information on the server device 2 itself and the information acquired by the server device 2 in a document format is displayed. When "new registration" is selected, a page for receiving new registration of login information and new registration of the system including the energy storage module group L or the power supply-related device is displayed. When "editing" is selected, a page for receiving editing of login information that has already been registered or editing of information on a system or device that has already been registered is displayed.

Further, the Web screen 330 includes a button 332 for a logout operation or a termination operation.

Figure 6:
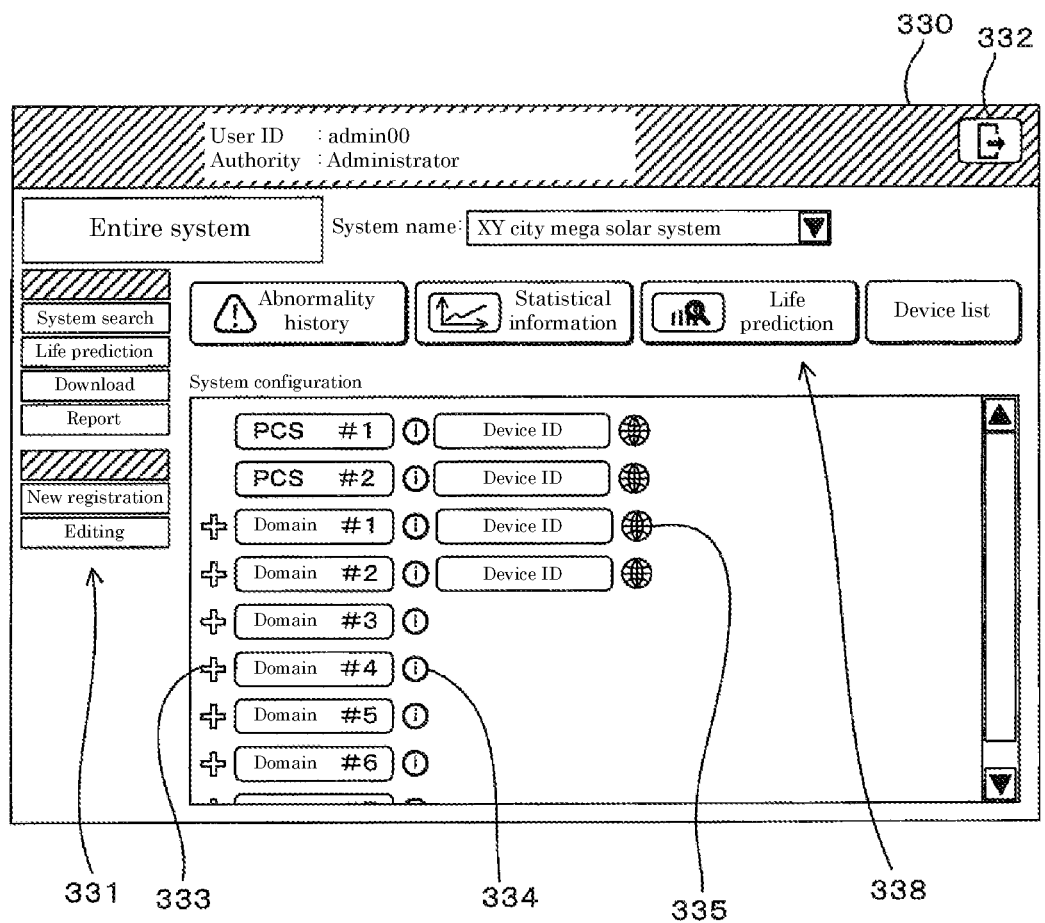
FIG. 6 is a diagram showing an example of a screen displayed collectively for each system.

Next, a screen example when the system is selected will be described. FIG. 6 is a diagram showing an example of a screen collectively displaying the energy storage devices and the power supply-related devices for each system. FIG. 6 shows an example of a screen displayed by step S206. Specifically, on the Web screen 330 displayed in FIG. 5, for example, the "XY city mega solar system" in which a large number of energy storage module groups L and power conditioners P are used is displayed on the display unit 33 when it is selected by the operation of the operation unit 34 of the client device 3. In the screen example of FIG. 6, in accordance with the system configuration of the energy storage system 101 used by the "XY city mega solar system", the respective names of two power conditioners P and energy storage module groups L configured in a plurality of banks are shown. For the energy storage module group L, a "+" icon 333 for expanding the hierarchical structure, an icon 334 for displaying detailed information of each, and an icon 335 for displaying detailed information (real time) are arranged. The icon 335 is arranged together with the identification information of the device in which the communication device 1 is mounted.

As shown in FIG. 6, the Web screen 330 collectively displayed for each selected system includes a menu icon 338 for the selected system. The menu icon 338 includes, for example, a menu of "abnormality history", "statistical information", "life prediction", and "device list". When the menu icon of "abnormality history" is selected by the operation of the operation unit 34 of the client device 3, the abnormality or caution (warning) logs detected by the energy storage module group L and the power supply-related device included in the entire target system are collectively displayed. When "statistical information" is selected, graphs of statistical information (transitions of voltage, current, temperature, etc.) for the entire target system are collectively displayed. When "life prediction" is selected, an interface for obtaining the result of life prediction for the entire system or each energy storage module group L included in the system is displayed. The details of the "life prediction" will be described later. When "device list" is selected, a device list of the power conditioner P, the energy storage module group L included in the system, the management device M mounted in the energy storage module group L, and the like is displayed. The device list may include detailed information such as the product name and model number.

In this way, it becomes possible to collectively display the information on the energy storage module group L and the power supply-related devices related to the energy storage module group L included in the "XY city mega solar system", and to display the state (detailed information) of each device from the page shown in FIG. 6 while allowing the configuration to be grasped.

Figure 7:
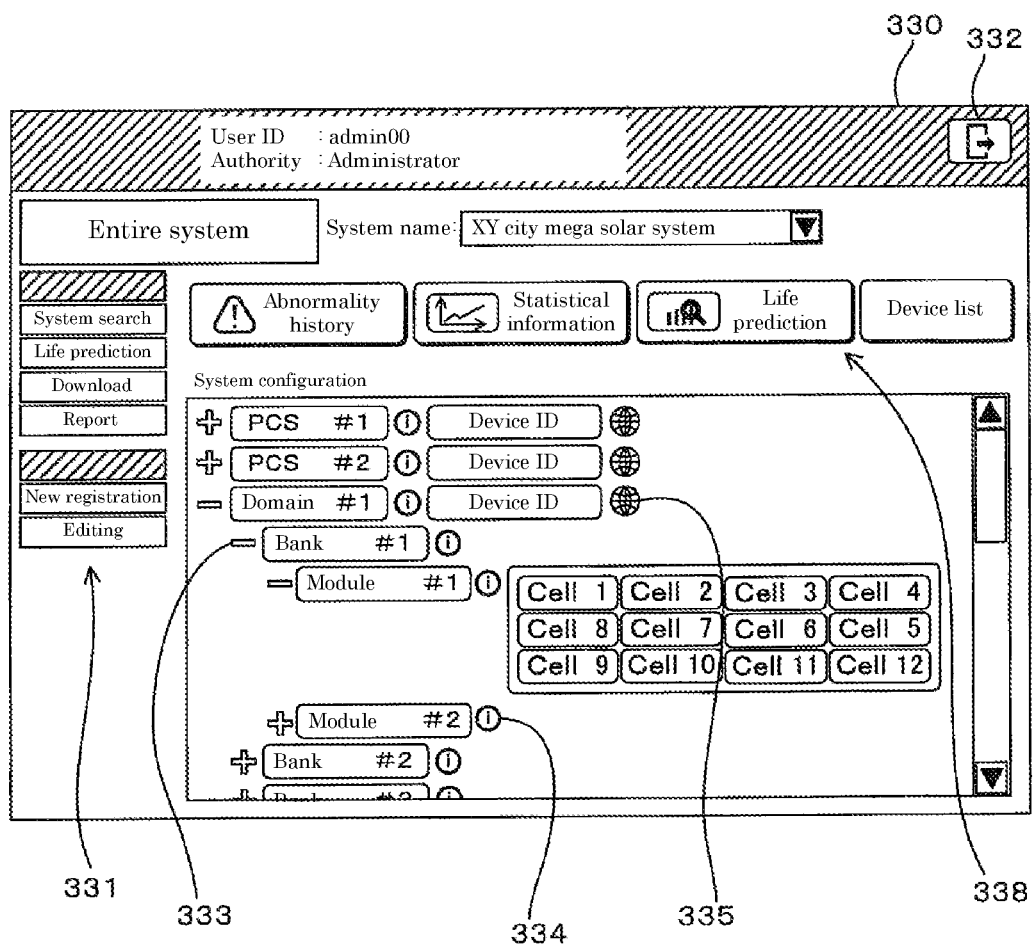
FIG. 7 is a diagram showing another example of a screen displayed collectively for each system.

FIG. 7 is a diagram showing another screen example collectively displaying the energy storage devices and the power supply-related devices for each system. The screen example of FIG. 7 is displayed when the icon 333 for displaying detailed information on the energy storage module group L in FIG. 6 is selected. The energy storage system 101 of the "XY city mega solar system" has the energy storage module group L with the configuration of having a plurality of domains each having in parallel a plurality of banks each including in series a plurality of modules each including n (n is a natural number. Twelve, in the present embodiment) cells. Accordingly, as shown in FIG. 7, when one domain is selected, a list corresponding to the banks belonging to the domain is expanded, and when one bank is selected, a list of the energy storage modules belonging to the bank is expanded. Each energy storage module includes n cells, and when one energy storage module is selected on the screen 330 by the operation of the operation unit 34 of the client device 3, a list (image) of cells included in the module is expanded.

In the example of displaying the expansion of the hierarchical structure of the energy storage module group L in FIG. 7, the icon 335 is arranged only in a hierarchy (domain in FIG. 7) corresponding to the management device M in which the communication device 1 is mounted/connected. The arrangement of the icons 335 is not limited to the example of FIG. 7. When the communication device 1 is connected in a hierarchical structure for each bank, the icon 335 may be arranged corresponding to each bank.

Figure 8:
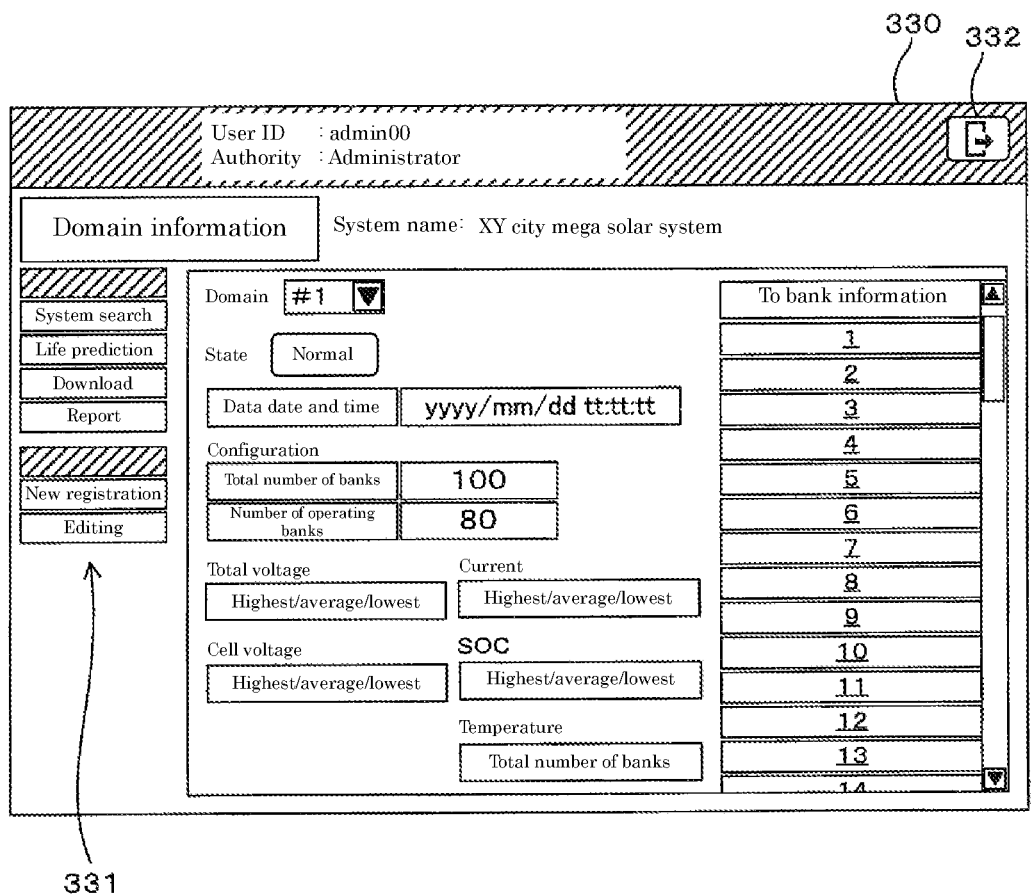
FIG. 8 is a diagram showing a display example of detailed information.

FIG. 8 is a diagram showing a display example of detailed information. FIG. 8 is an example of a page displayed when the icon 334 in a hierarchy corresponding to the domain of the energy storage module group L in FIG. 7 is selected. In FIG. 8, as the "domain information", the state of the domain (normal/abnormal), the number of banks included in the domain (total number of banks), the number of banks operating in all banks (number of operating banks), and the total voltage, current, cell voltage, SOC, and temperature distribution (highest value, average value, and lowest value) of the domain are displayed. The "data date and time" at which the server device 2 acquired the "domain information" via the communication device 1 is also displayed on the Web screen 330 of the display unit 33. The "domain information" includes links to the detailed information of the banks included in the domain for the number of banks.

Figure 9:
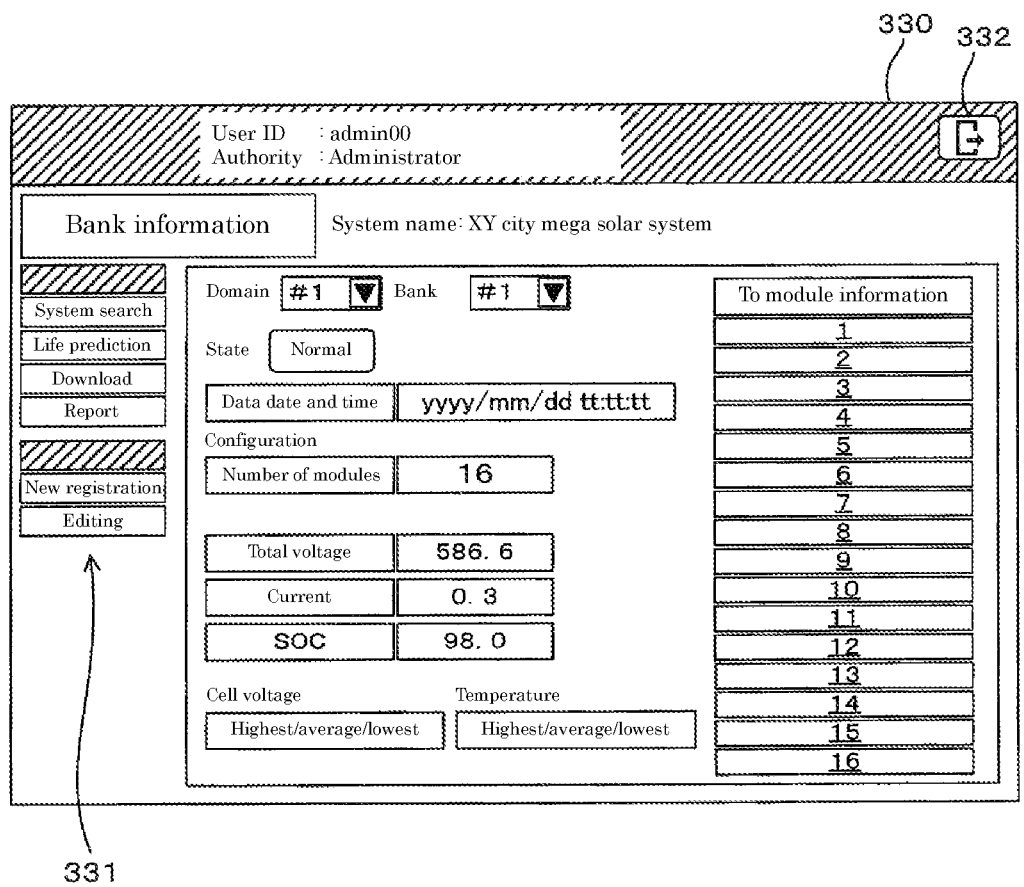
FIG. 9 is a diagram showing a display example of detailed information.

FIG. 9 is a diagram showing a display example of detailed information. FIG. 9 is an example of a page displayed when the icon 334 in a hierarchy corresponding to the bank in FIG. 7 is selected. This page is also displayed when the link to detailed information on the bank is selected in FIG. 8. In FIG. 9, as the "bank information", the state of the bank (normal/abnormal), the number of modules included in the bank (the number of modules), the total voltage value, the current value, and SOC of that bank, the voltages of the cells included in the bank, and the temperature distribution are displayed. The "data date and time" at which the "bank information" is acquired by the server device 2 via the communication device 1 is also displayed on the Web screen 330 of the display unit 33. The "bank information" includes links to the detailed information on the energy storage modules included in the bank for the number of modules.

Figure 10:
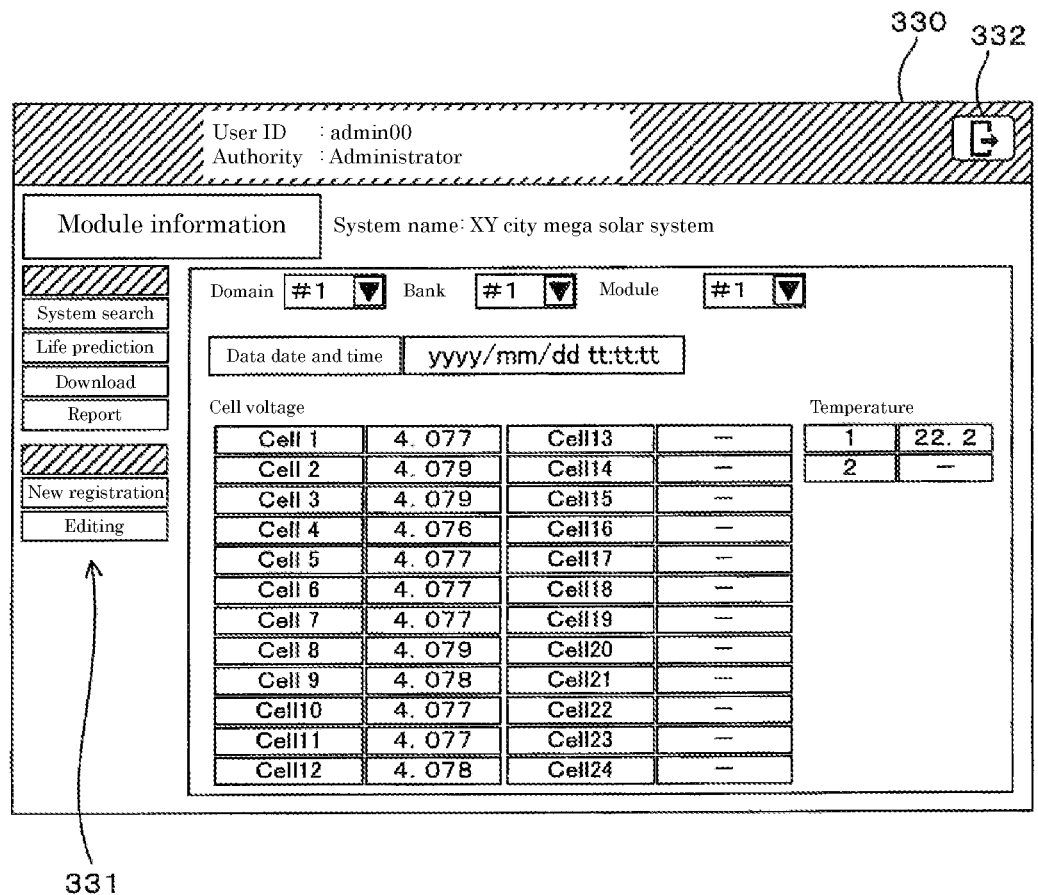
FIG. 10 is a diagram showing a display example of detailed information.

FIG. 10 is a diagram showing a display example of detailed information. FIG. 10 is an example of a page displayed when the icon 334 in a hierarchy corresponding to the module in FIG. 7 is selected. This page is also displayed when the link to the detailed information on the module in FIG. 9 is selected by the operation of the operation unit 34 of the client device 3. In FIG. 10, as the "module information", the voltage of each cell included in the energy storage module and the outputs of the temperature sensors provided in two cell groups are displayed.

The screens of pages for each hierarchy of the energy storage module group L displayed in FIGS. 7 to 10 are examples. For example, when there is no domain information and the energy storage module group L is composed of a plurality of parallel banks, the uppermost layer is displayed as a bank. If the energy storage module group L is composed of only one bank, that is, for example, sixteen energy storage modules connected in series, only the module information (FIG. 10) obtained from the corresponding communication device 1 is displayed.

Figure 11:
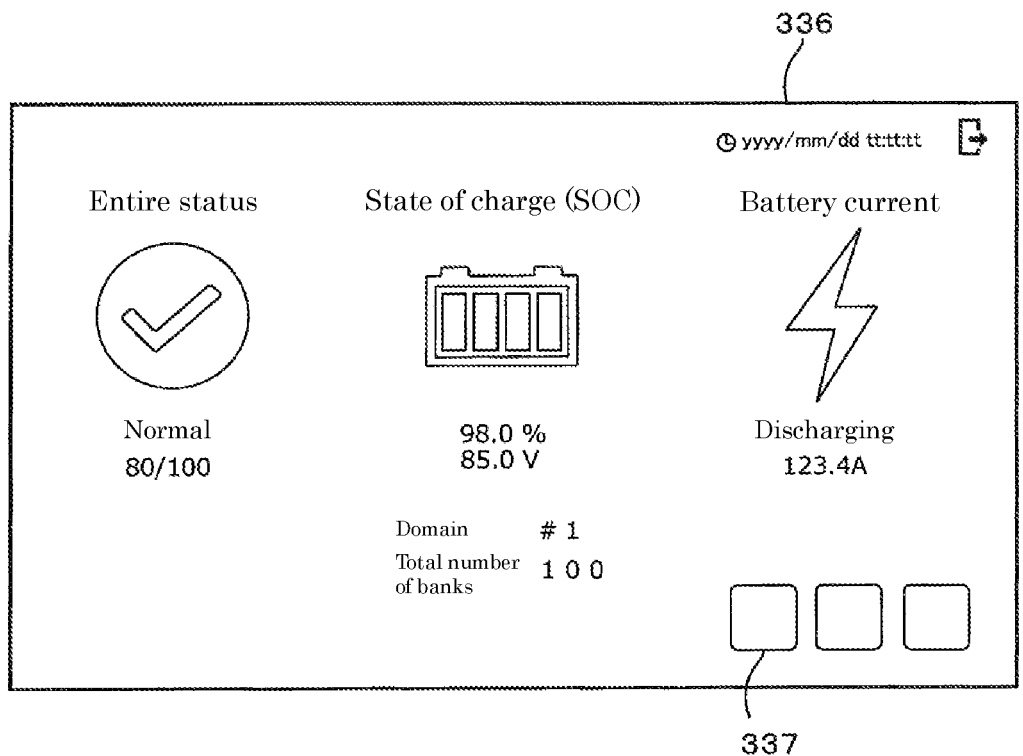
FIG. 11 is a diagram showing a display example of detailed information.

FIG. 11 is a diagram showing a display example of detailed information. FIG. 11 is a screen displayed when the icon 335 in a hierarchy corresponding to the domain in FIG. 6 is selected, and shows an example of the Web screen 336 provided by the Web server of the communication device 1 mounted/connected to the management device M shown in FIG. 3. In order to display the Web screen 336 shown in FIG. 11, it is necessary to log in to the Web server. It is preferable that the login information at this time be the same as the login to the Web server provided by the server device 2 in FIG. 5, and the page in FIG. 11 be displayed by automatically logging in without performing the operation of inputting the login information again.

In the example shown in FIG. 11, the communication device 1 provides, directly to the client device 3, information obtained from the control board mounted in each energy storage module via the management device M provided in each bank belonging to the domain through the Web screen 336. For example, when an abnormality is detected, the content or location of the abnormality is displayed by character information (error code) or images such as colors, animations, and schematic diagrams. The information provided from the communication device 1 through the Web screen 336 is basically the latest information at that time, and is distinguished from the data stored in the storage unit 21 of the server device 2.

The Web screen 336 displayed by the function of the Web server of the communication device 1 preferably includes a plurality of menu icons 337 for performing processing on the management device M or the control board via the communication device 1. The plurality of menu icons 337 include, for example, a menu for displaying various information including the above-described abnormality information obtained via the communication device 1, and a menu for setting a time, an email address for notification, and the like to the communication device 1 or for restart (shutdown). The menu icon 337 may include a setting menu for remote operation limited to those having maintenance personnel authority and a setting menu for log intervals and the like.

Although FIG. 11 exemplifies the Web screen 336 provided from the communication device 1 mounted in the management device M provided in the energy storage module group L, a similar Web screen is also provided from the communication devices 1 mounted in the power conditioner P, the uninterruptible power system U, and the rectifier D.

As described above, the server device 2 collects the information on each device by using, as the network card type, the communication device 1 that can be universally mounted in not only the energy storage module, but also the power conditioner P, the uninterruptible power system U, and the rectifier D. As a result, not only connection to the individual devices becomes possible via the communication devices 1, but the client device 3 can collectively acquire the information on each energy storage module and the power supply-related device from the server device 2 in a system or location unit including them.

Figure 12:
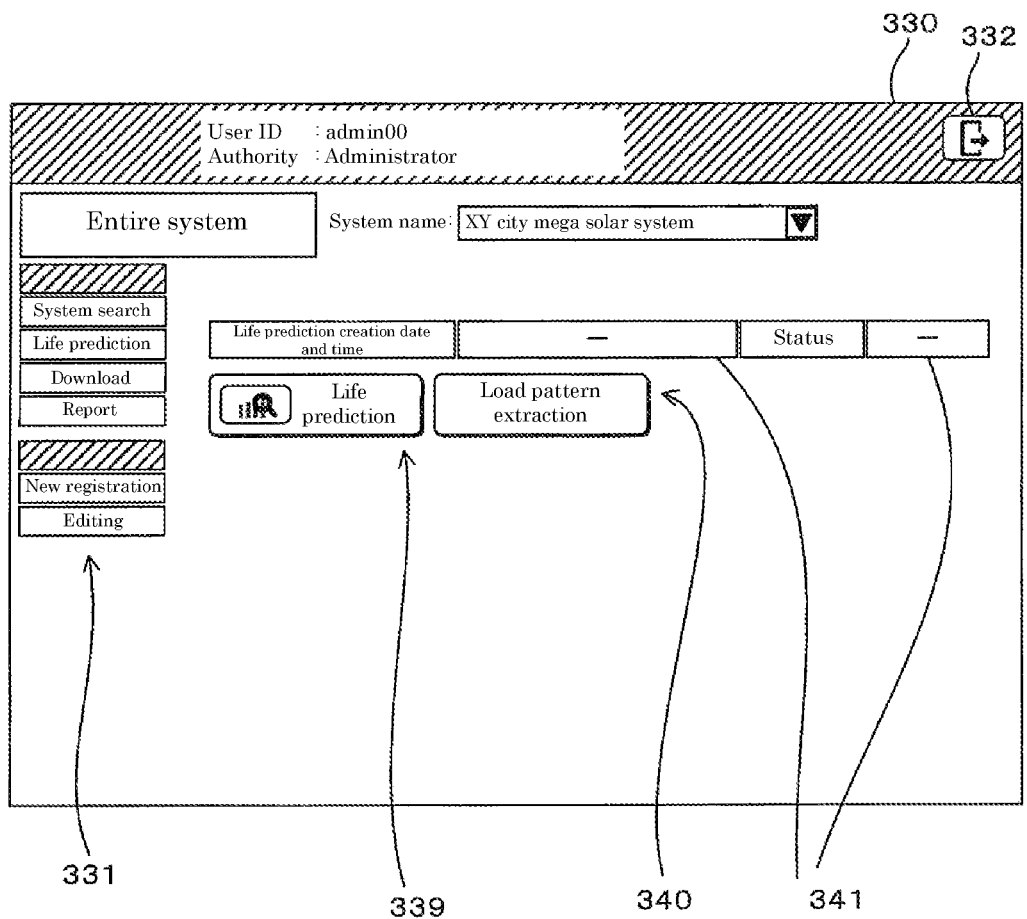
FIG. 12 is a diagram showing an example of a screen for receiving a life prediction request.

Processing performed when the life prediction menu for the energy storage system 101 is selected will be described. FIG. 12 is a diagram showing an example of a screen for receiving a life prediction request. FIG. 12 is a screen displayed when "life prediction" is selected from the menu icons 338 in FIG. 6. On the screen 330 of FIG. 12, an icon 339 for receiving a life prediction request again, an icon 340 for receiving a load pattern extraction request, and a display box 341 indicating the date when the request is received and the status are displayed. The server device 2 regularly collects information (voltage, current, and temperature) from the energy storage module group L as described above. The server device 2 has a function of predicting/estimating the life of the system based on the collected information. When the icon 339 for receiving the life prediction request is selected, the controller 20 of the server device 2 detects the selection and executes the life prediction calculation (simulation). The calculation may be executed in the server device 2, but may be executed in a distributed manner in a dedicated device or a dedicated device group different from the server device 2. The time required for the life prediction calculation (simulation) increases as the amount of collected information increases, and may take, for example, one to two hours. The screen 330 shown in FIG. 12, when the life prediction calculation is started, can display, in the display box 341, the text indicating the date and time when the request is received and the calculation status, and can transition to another page. Since the calculation requires time as described above, it is avoided that the screen 330 is fixed on the life prediction reception screen during execution and other functions cannot be used during that time. When the life prediction calculation is completed, the server device 2 displays a text "completion" indicating the date and time when the calculation ends and the status in the display box 341 of the screen displayed when "life prediction" in the menu icon 338 is selected, and displays the icon for downloading the calculation result file. When this icon is selected by the operation unit 34 of the client device 3, the calculation result file is transmitted to the client device 3 via the Web browser. When the life prediction calculation is completed, the server device 2 notifies the previously stored mail address that the calculation is completed. The progress may be notified by email. The calculation result file of life prediction may be attached to the email.

Figure 13:
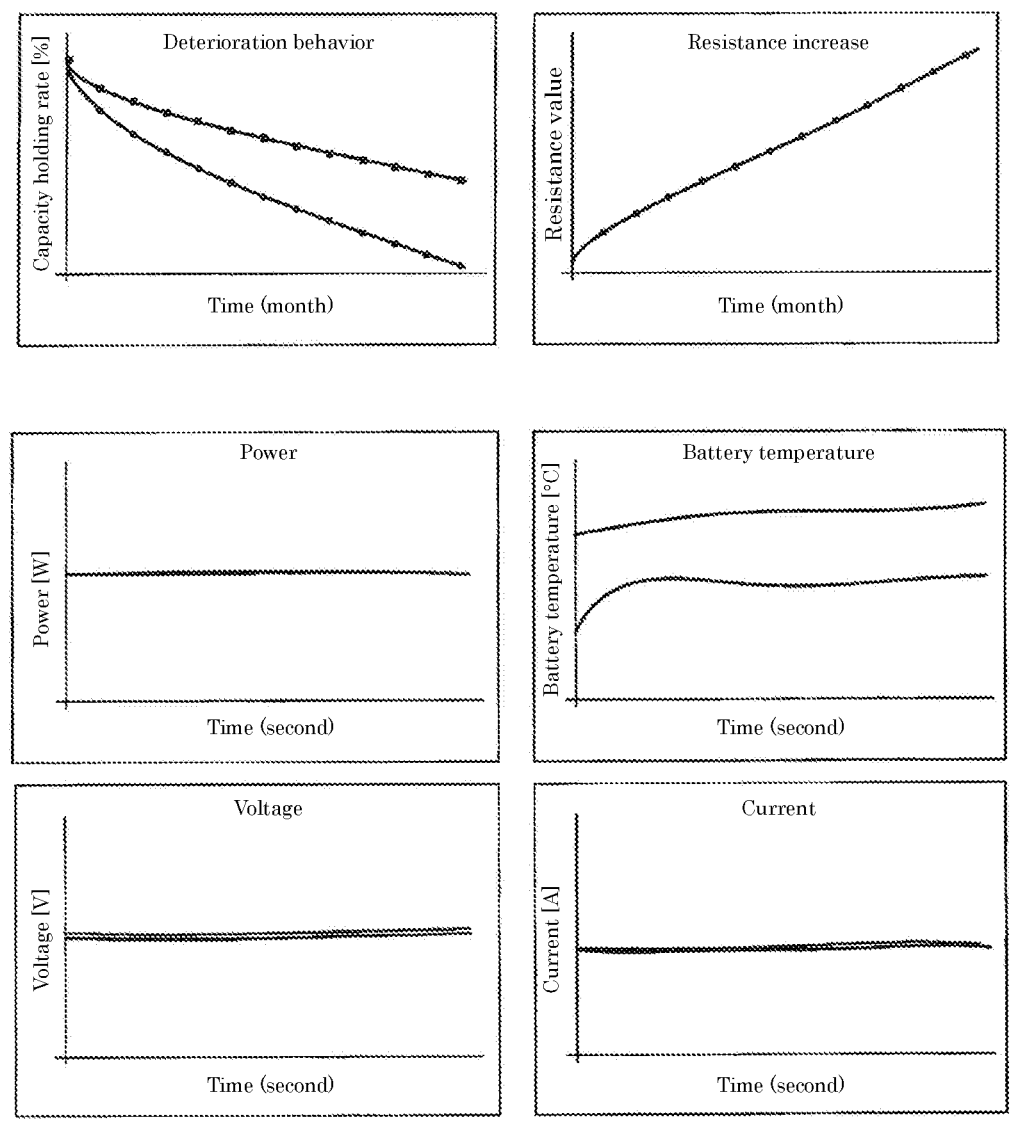
FIG. 13 is a diagram showing an example of contents of data obtained by life prediction.

FIG. 13 is a diagram showing an example of contents of data obtained by life prediction. The data obtained by the life prediction includes, for example, as shown in FIG. 13, a graph showing the deterioration behavior of the energy storage device from the start of use until after a predetermined period (for example, ten years), and graphs of simulation results for the behavior of charging/discharging (power, temperature, voltage, and current) during the predetermined period. The data obtained by the other life prediction includes the numerical value transition during the period of the related parameter which is the simulation result, and the detailed analysis result. In this way, the result of life prediction for each system based on the information collected by the server device 2 can be obtained from the comprehensively displayed Web screen. It is possible to obtain accurate results by calculating the long-term result data without stopping other functions during the life prediction calculation.

The example in which the energy storage module and the energy storage module group L are composed of a plurality of lithium ion battery cells has been described. Alternatively, the energy storage module and the energy storage module group L (or part of them) may be composed of a plurality of lead-acid batteries or capacitors.

The power conditioner P includes an energy storage device (lithium ion battery or lead-acid battery) and a management device M in addition to the communication device 1, and may transmit display information for collectively displaying the information on the power conditioner P and the information on the energy storage device.

The uninterruptible power system U includes an energy storage device (lithium ion battery or lead-acid battery) and a management device M in addition to the communication device 1, and may transmit display information for collectively displaying the information on the uninterruptible power system U and the information on the energy storage device.

The rectifier D includes an energy storage device (lithium ion battery or lead-acid battery) and a management device M in addition to the communication device 1, and may transmit display information for collectively displaying the information on the rectifier D and the information on the energy storage device.

As another embodiment, the following configurations can be also realized. A computer program that causes a computer including a display unit to display information on an energy storage device, the computer program causing the computer to execute a step of requesting the information on the energy storage device, and a step of displaying information by associating the information with each other in a hierarchical manner based on the connection configuration of the energy storage device transmitted in response to the request. This configuration makes it possible to cause the display unit of the computer to transition from the display shown in FIG. 6 to the display shown in FIG. 7. The computer program may be configured to cause the display unit of the computer to transition from the display shown in FIG. 7 to the display shown in FIG. 8, FIG. 9, or FIG. 10. This computer program may be executed by the server device 2 or the client device 3. In a large-scale energy storage system including an extremely large number of energy storage cells, it is possible to easily grasp the states of the bank level, module level, and cell level in addition to the states of the entire level (domain level).

The energy storage device, the power conditioner P, the uninterruptible power system U, and the rectifier D are all monitored by the monitoring system 100. The number of energy storage cells of the energy storage device is much larger than the number of power supply-related devices. Therefore, it is preferable that information on the energy storage device is displayed in a hierarchical manner (by breakdown) like a domain level, a bank level, a module level, and a cell level. In the upper hierarchy (for example, domain level) of the energy storage device, it is preferable to display information on the energy storage device and the power supply-related device in the same layer as shown in FIG. 6. As a result, the state of the entire system including the energy storage device and the power supply-related device can be intuitively grasped.

The above-described embodiments are exemplifications in all respects, and are not restrictive. Other embodiments will be described below.

Second Embodiment

An information processing system according to the present disclosure includes a plurality of communication devices connected to an energy storage device and a power supply-related device, and an information processing device that transmits and receives information to and from the plurality of communication devices. Each of the plurality of communication devices includes: a first transmission unit that, when having received a transmission request from the information processing device, transmits information including a state obtained from the connected energy storage device or power supply-related device to the information processing device; a storage unit that stores screen data for screen display having a common portion that is common regardless of the type of the connected energy storage device or power supply-related device and an individual portion that differs depending on the type; a creation unit that, when having received a connection request, creates display information for displaying the screen at a request source based on the screen data; and a second transmission unit that transmits the created display information to the request source.

With the above configuration, various information including the state of the energy storage device itself or the power supply-related device can be individually presented by the communication device provided in each of the energy storage device and the power supply-related device. The presented information is displayed in a different mode while including the common portion, depending on the type of a target, that is, whether the target is the energy storage device itself, or the power supply-related device (what is the device). Even in a system including a wide variety of devices, it is possible to easily visually grasp which state information is acquired and displayed.

The information processing device includes a storage unit that stores information transmitted in response to a transmission request to the plurality of communication devices, and a creation unit that creates display information for displaying a screen including information stored in the storage unit and connection information to the communication devices, and the creation unit may create and transmit the display information when the connection request is received.

Information including the states of the energy storage device itself and the power supply-related device is collected from each communication device and collectively presented by a specific information processing device, and the presented information includes connection information to each communication device. From the user or maintenance personnel, it is possible to acquire individual state information together with the collective information for each system or for each place. Based on the information presented from the information processing device, access to individual information on the energy storage device or the power supply-related device is also facilitated.

The communication device may include an execution unit that executes a Web server program corresponding to a Web browser of a communication terminal device, and the display information may be Web page information.

Each communication device has the function of a Web server, and provides, to the communication terminal device, a Web page having a common portion for layout, background images, etc., and an individual portion for realizing individual designs, material images, and screen transitions according to the type of the connected device.

The communication device stores, in the storage unit, a communication program for external cooperation that differs depending on the type of the connected energy storage device or power supply-related device, and may receive a communication connection based on a protocol from the communication terminal device.

In addition to a common Web server program, each communication device individually stores an external cooperation program that realizes a protocol (message format) or function that differs depending on the type of the connected device. Many programs stored in communication devices are common, including Web server programs. However, as an individual program, if the device is an uninterruptible power system, a program that allows receiving shutdown control from the outside is stored, and if it is another device, a program for communication conforming to the abnormal communication protocol for each device is stored.

The communication device according to the present disclosure includes: a first communication unit that is connected to an energy storage device or power supply-related device and communicates with the energy storage device or power supply-related device; a second communication unit that communicates with a first device or a second device; a first transmission unit that, when the second communication unit receives a transmission request from the first device, transmits information including the state of the energy storage device or power supply-related device obtained from the first communication unit to the first device from the second communication unit; a storage unit that stores screen data for screen display; and a second transmission unit that, when a connection request is received from the second device, acquires information including the state of the energy storage device or power supply-related device from the first communication unit, creates display information for displaying the acquired information based on the screen data, and transmits the created display information to the second device from the second communication unit.

An information processing method according to the present disclosure processes information by a plurality of communication devices connected to an energy storage device and a power supply-related device, and an information processing device that transmits and receives information to and from the plurality of communication devices. Specifically, each of the plurality of communication devices, when having received a transmission request from the information processing device, transmits information including a state obtained from the connected energy storage device or power supply-related device to the information processing device, stores screen data for screen display having a common portion that is common regardless of the type of the connected energy storage device or power supply-related device and an individual portion that differs depending on the type, creates display information for displaying a screen on the communication terminal device based on the screen data when a connection request from the communication terminal device is received, and transmits the created display information to the communication terminal device.

A computer program according to the present disclosure causes a computer including a display unit to receive and display information on an energy storage device and a power supply-related device. The computer program causes the computer to execute a step of requesting a communication connection to a communication device connected to the energy storage device and power supply-related device, a step of receiving, from the communication device, screen display information having a common portion that is common regardless of the types of the energy storage device and power supply-related device and an individual portion that differs depending on the type, and a step of displaying screen depending on the type of the energy storage device and power supply-related device based on the received screen display information.

Figure 15:
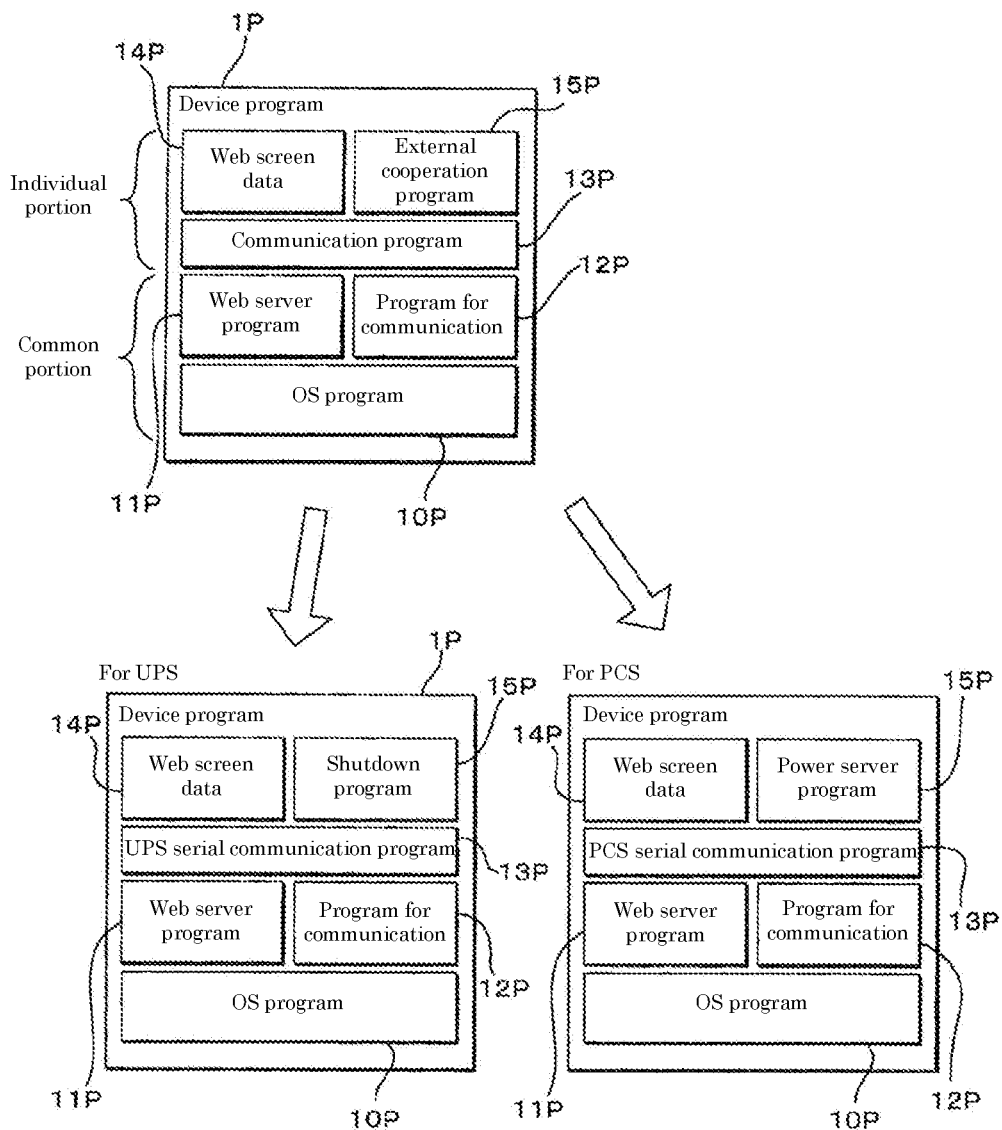
FIG. 15 is a schematic diagram showing a program configuration of a device program stored in a storage unit of the communication device.

FIG. 15 is a schematic diagram showing a program configuration of the device program 1P stored in the storage unit 11 of the communication device 1. As described above, the device program 1P includes, in addition to an embedded OS program 10P using Linux (registered trademark) or the like and a Web server program 11P operating on the OS, a program for communication 12P conforming to SSH, SNMP, and the like. The device program 1P includes these programs as a common portion. The device program 1P includes an individual portion that is individually read according to which of the power conditioner P, the management device M, the uninterruptible power system U, and the rectifier D is connected. The individual portion includes a communication program 13P for a communication protocol unique to each device, Web screen data (including design data, material image data, screen transition information) 14P, and an external cooperation program 15P.

The communication program 13P includes a protocol (serial communication protocol such as RS-232C, RS-485, or USB or other signal input/output) for communicating with the target device, and programs (status codes, etc.) for interpreting the signals that are communicated with that protocol. The protocol is unique to each device, tabulated and stored in the storage unit 11, and may be readable by the communication program 13P.

The Web screen data 14P includes design data, material image data, and screen transition information that differ depending on the target device. The communication device 1 connected to the management device M of the energy storage module group L stores Web screen data 14P for displaying state information such as state of charge, error information and the like. The communication device 1 mounted in the power conditioner (PCS) P stores Web screen data 14P for displaying state information that indicates, for example, during charging, during discharging, during power selling, or during power purchasing, and error information. The communication device 1 mounted in the uninterruptible power system (UPS) U stores Web screen data 14P for displaying a screen showing state information and error information, and a screen for receiving remote operation. The Web screen provided from the communication device 1 of the present embodiment has the same color combination, layout, and the like, but items including images, patterns, colors, and the like included in the screen differ depending on the type of the device. The difference in the displayed Web screen for each device will be described later.

The external cooperation program 15P is, for the power conditioner P, a client program for cooperation with, for example, an electric power server, and for the uninterruptible power system U, is a program for cooperation with an existing shutdown program. Individual programs may be prepared also for the rectifier D and the energy storage module group L, or the external cooperation program 15P may not be executed or stored depending on the target device.

Figure 16:
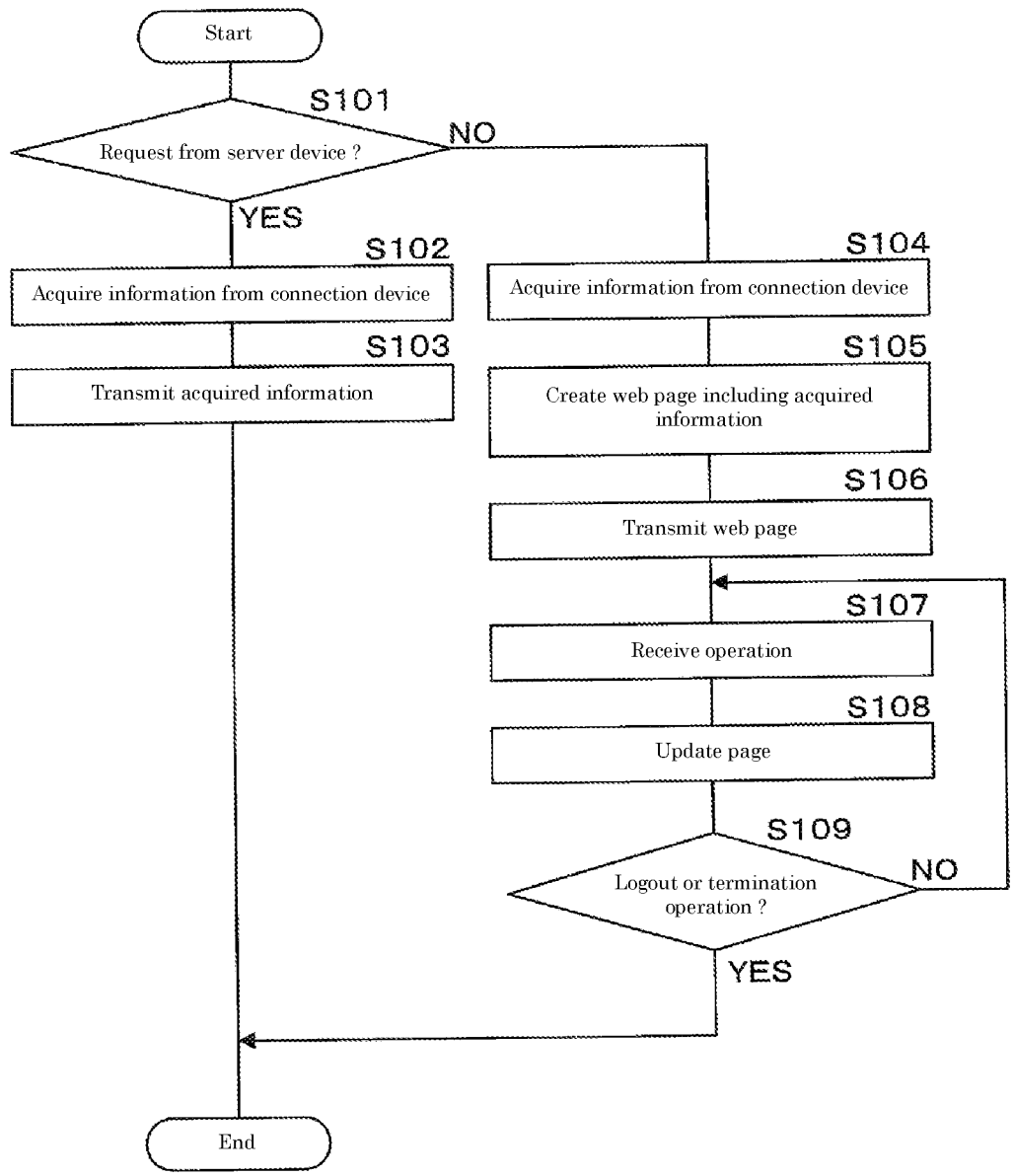
FIG. 16 is a flowchart showing an example of a processing procedure in the communication device.

FIG. 16 is a flowchart showing an example of the processing procedure in the communication device 1. The controller 10 of the communication device 1 starts the following processing each time the second communication unit 13 detects a communication event from the server device 2 or the client device 3.

The controller 10 determines whether or not the communication event is a transmission request from the server device 2 (step S101). When it is determined that the communication event is a transmission request from the server device 2 (S101: YES), the controller 10 causes the first communication unit 12 to acquire the latest information from the connected device, or reads and acquires information that is acquired in advance and temporarily stored (step S102). The controller 10 transmits various information such as the acquired state from the second communication unit 13 to the server device 2 (step S103), and ends the processing. The controller 10 may transmit the acquired information by the first communication unit 12 according to a preset schedule (10 minutes, 30 minutes, hourly, etc.) even without receiving the transmission request in step S101.

When it is determined in step S101 that the communication event is not the transmission request from the server device 2 (step S101: NO), the communication event is a connection request from the client device 3. The controller 10 acquires the latest information including the state information from the devices connected by the first communication unit 12 (step S104). The controller 10 creates a Web page including the latest information acquired (updates the data included in the Web page) (step S105), and transmits data of the created Web page to the client device 3 as the request source from the second communication unit 13 (step S106).

The controller 10 acquires and receives an operation on the Web page in the client device 3 through communication (step S107), and updates the Web page according to the operation (step S108). The controller 10 determines whether or not a logout operation or a termination operation of the Web browser has been performed on the operation unit 34 of the client device 3 (step S109), and ends the processing when it is determined that the logout operation or the termination operation has been performed (S109: YES). When it is determined that the logout operation or the termination operation has not been performed (S109: NO), the controller 10 returns the processing to step S107, and continues to receive the operation.

In the communication device 1, based on the stored screen data 14P, the operation unit 34 of the client device 3 causes the Web screen 336 to transition in accordance with the selection operation of various icons such as these menu icons 337 on the Web screen 336 (FIG. 11). A detailed information display screen, a setting input screen, and the like are displayed according to the selection of the menu.

Figure 17:
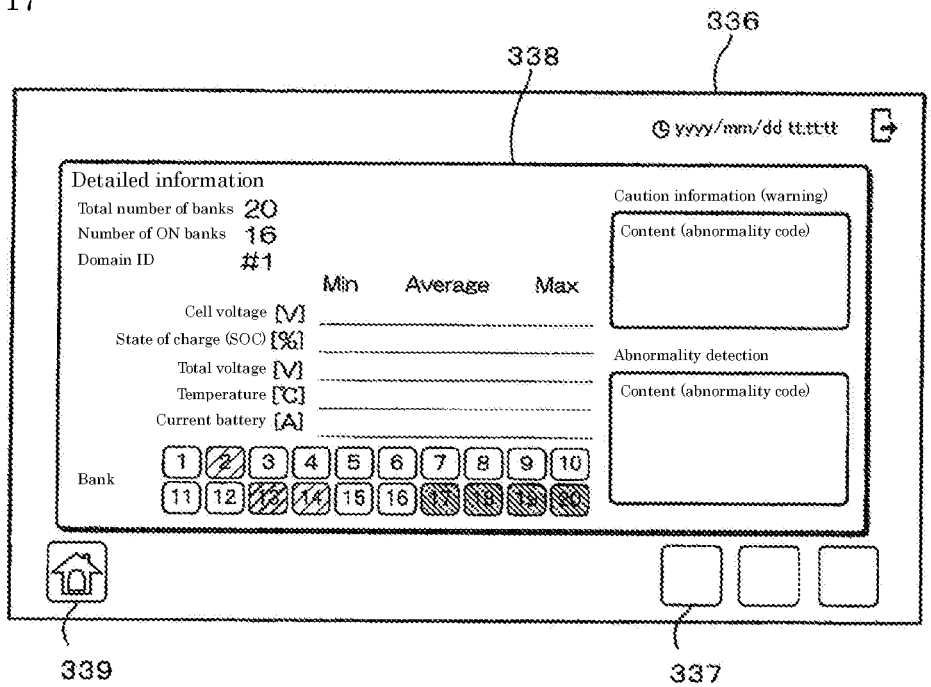
FIG. 17 is a diagram showing an example of a Web screen presented from a communication device.

FIG. 17 is a diagram showing an example of a Web screen presented from the communication device 1. FIG. 17 is an example of a screen displayed when the icon for displaying detailed information is selected from the menu icons 337 of FIG. 11. When the menu icon 337 is selected, as shown in FIG. 17, a screen 338 is displayed with an effect that is superimposed on the Web screen 336, and an icon 339 for returning to the Web screen 336 of FIG. 11 is displayed. On the screen 338, real-time detailed information of the domain corresponding to the management device M to which the communication device 1 is connected is displayed as detailed information. As the detailed information, for example, the number of banks included in a domain (total number of banks), the number of operating banks in all banks (number of ON banks), and the lowest value, average value, and highest value in each of a cell voltage, SOC, total voltage, temperature, and current in that domain are displayed. In the detailed information, when the caution information or the abnormality detection result is output by the self-diagnosis function of the management device M or the control board for each module, a message indicating the content and a corresponding abnormality code may be displayed. On the detailed information screen 338, the state in the bank hierarchy below the domain hierarchy is represented by a pattern with identification information such as the number of each bank. The state may be distinguished and displayed by a color, brightness, or a pattern. In the example of FIG. 17, since banks #17 to #20 are not in operation, they are displayed in gray, for example. Further, when the pattern corresponding to each bank is selected on the screen 338 by the operation unit 34, a link is provided and the display is switched to the display of detailed information of the bank in the screen 338. The screen displaying the bank information may include a link to detailed information of each energy storage module.

Depending on the contents of the selected menu, a list of event logs may be displayed, the setting information including the addresses of the communication device 1 and the management device M, device specific information, and notification email addresses that have been set may be displayed, or SNMP connection information may be displayed.

Figure 18:
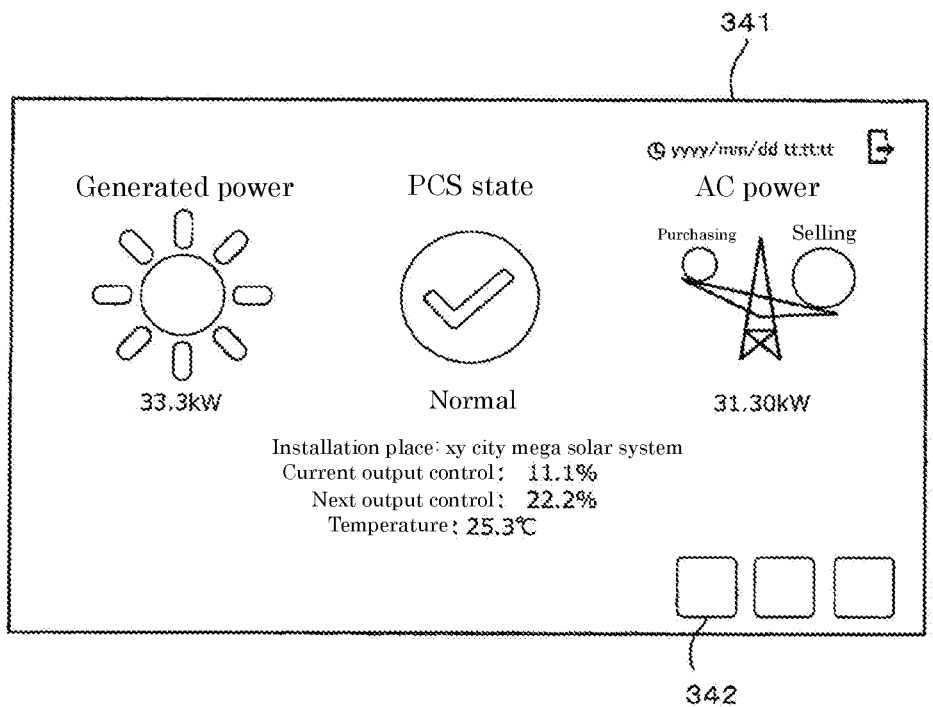
FIG. 18 is a diagram showing another example of the Web screen presented from the communication device.

FIG. 18 is a diagram showing another example of the Web screen presented from the communication device 1. FIG. 18 is a screen displayed when the icon 335 corresponding to the power conditioner (PCS) P in FIG. 7 is selected, and shows a new Web screen 341 provided by the Web server of the communication device 1 connected to the power conditioner P. The information displayed on the Web screen 341 is output based on the Web screen data 14P (FIG. 15) that is individually stored for the power conditioner P. Login is also required to display on the Web screen 341 provided from the communication device 1 shown in FIG. 18. The login information at this time is the same as the login to the Web server provided by the server device 2, whereby login is automatically performed and the login information is displayed without performing the operation of inputting the login information on the client device 3 again.

In the example shown in FIG. 18, the communication device 1 provides the client device 3 with the information obtained from the control units of the power conditioners P (four in the example of FIG. 19) that are serially connected. As shown in FIG. 18, the web screen 341 for displaying the information on the power conditioner P includes character information indicating an item of "generated power" indicating the real-time generated power in the power generating system connected to the power conditioner P, and an item of "PCS state" indicating the state of the entire power conditioner P group. The Web screen 341 further includes character information indicating an item of "AC power" indicating the size (power selling/power purchasing) of the total AC power (positive) and total AC power (negative) of the power conditioner P (PCS, which is the parent machine among the multiple connections). As shown in FIG. 18, each item includes a pattern that visually shows the state of each item. Specifically, the "generated power" is associated with "the sun (the total value of the generated power is equal to or more than a predetermined ratio to the maximum value)", the "PCS state" is associated with a "check mark (normal)", and the "AC power" is associated with "balance" pattern. The pattern is made to change according to the state, and if the "generated power" is less than the predetermined ratio to the maximum value, the "cloud" is displayed instead of the "sun", and if it is unknown, a "question mark" is displayed. If the "PCS state" is abnormal, an "exclamation mark" is displayed instead of the "check mark", and if it is unknown, the "question mark" is displayed. The color of the mark may also change from a cold color system such as green or blue to a warm color system such as yellow or red depending on the state. As for the "balance" pattern, a display is made such that "during power selling" when the total AC power (positive) is larger than the total AC power (negative), and "during power purchasing" when it is smaller. In addition, for the item of "generated power", a real-time numerical value of the specific generated power is displayed, for "PCS state", "normal" or "abnormal" character information, and for "AC power", a difference (absolute value) between the total AC power (positive) and the total AC power (negative).

On the Web screen 341, the installation place (or the included system name) of the power conditioner P is displayed, and information such as output control ratio and temperature is displayed as character information. The state of charge of the connected energy storage module group L may be displayed in the Web screen 341 together with the pattern.

As shown in FIG. 18, the Web screen 341 for displaying the information on the power conditioner P includes a plurality of menu icons 342. Each of the plurality of menu icons 342 includes, for example, a menu for displaying various information including the above-described abnormality information obtained via the communication device 1. Further, the menu icon 342 includes a menu for executing settings of the time on the communication device 1 in the client device 3, a notification email address, and the like, network settings, settings related to SNMP, settings related to control via serial communication, or restart (shutdown) of the communication device 1. The contents of the Web screen 341 differ depending on the login information. The menu icon 342 of the Web screen 341 displayed by the login information having the maintenance personnel authority includes menus for output control setting, output control schedule setting, contract capacity confirmation, surplus purchase setting, password setting, and the like.

Also on the Web screen 341 regarding the power conditioner P, the screen transitions according to the selection operation of the menu icon 342 by the operation unit 34 of the client device 3. On the Web screen 341 for the power conditioner P, a detailed information display screen, a setting input screen, and the like are displayed according to the selection of the menu.

Figure 19:
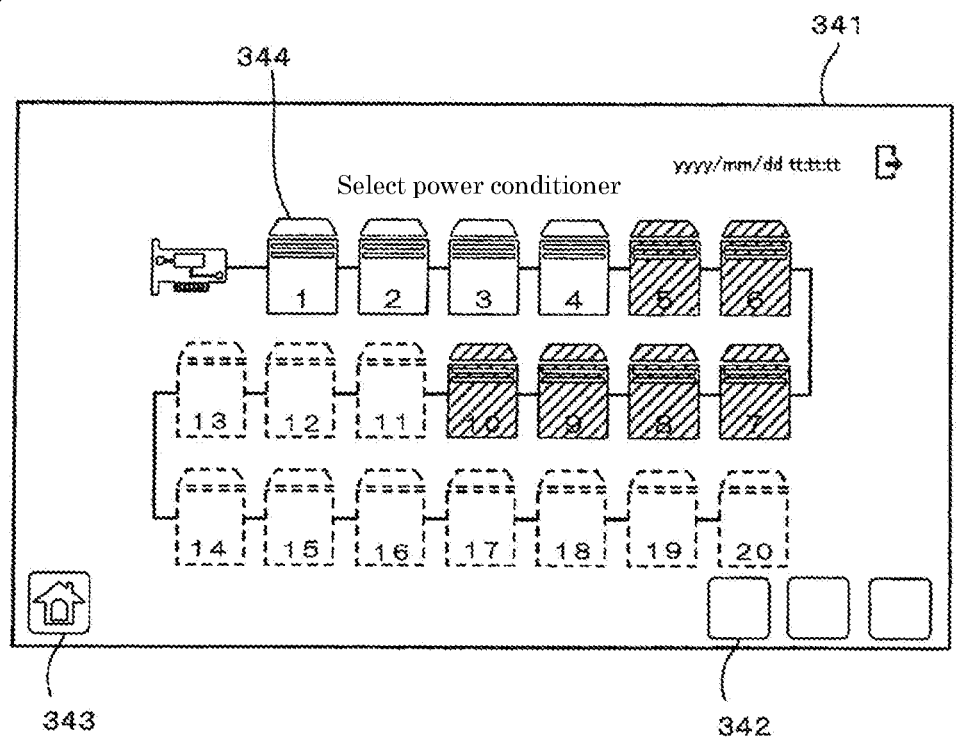
FIG. 19 is a diagram showing an example of the Web screen presented from the communication device.

FIG. 19 is a diagram showing an example of a Web screen presented from the communication device 1. FIG. 19 is an example of a screen displayed when a menu for showing detailed information, that is, detailed information on each of the plurality of power conditioners P is selected with the menu icon 342 of FIG. 18. When the Web screen 341 changes to another content, an icon 343 for returning to the Web screen 341 in FIG. 18 is displayed. Then, as shown in FIG. 19, when the menu icon 342 is selected, an icon 344 corresponding to each of the power conditioners P connected in a serial communication to the communication device 1 is displayed on the Web screen 341. Identification information such as a number for identifying the power conditioner P is attached to each icon 344, and the display mode differs depending on the state of each power conditioner P. In FIG. 19, the icons corresponding to the operating power conditioners P (#1 to #4) are displayed in solid lines and plain. The icons 344 corresponding to the non-operating power conditioners P are displayed in solid lines and in gray color (indicated by hatching in the figure). In the warning state and the state in which the abnormality is detected, it is preferable to change the plain color to yellow, red, or the like so as to be easily visually recognized. Where a maximum of twenty power conditioners P can be connected in a serial communication, the icons 344 corresponding to the unconnected power conditioners P are displayed by a broken line. It is preferable that the mode be changed according to the state, such that a question mark is attached when the power conditioners are connected in a serial communication but actually cannot communicate with each other. Each icon 344 is provided with a link to a screen showing individual detailed information (corresponding to an abnormality code in the warning state or the abnormality detection state) on the corresponding power conditioner P, and when selected, the display is switched to display of detailed information on the power conditioner P in the screen 341.

Depending on the contents of the selected menu, a list of event logs may be displayed, the setting information including the addresses of the communication device 1 and the management device M, device specific information, and notification email addresses that have been set may be displayed, or SNMP connection information may be displayed.

Figure 20:
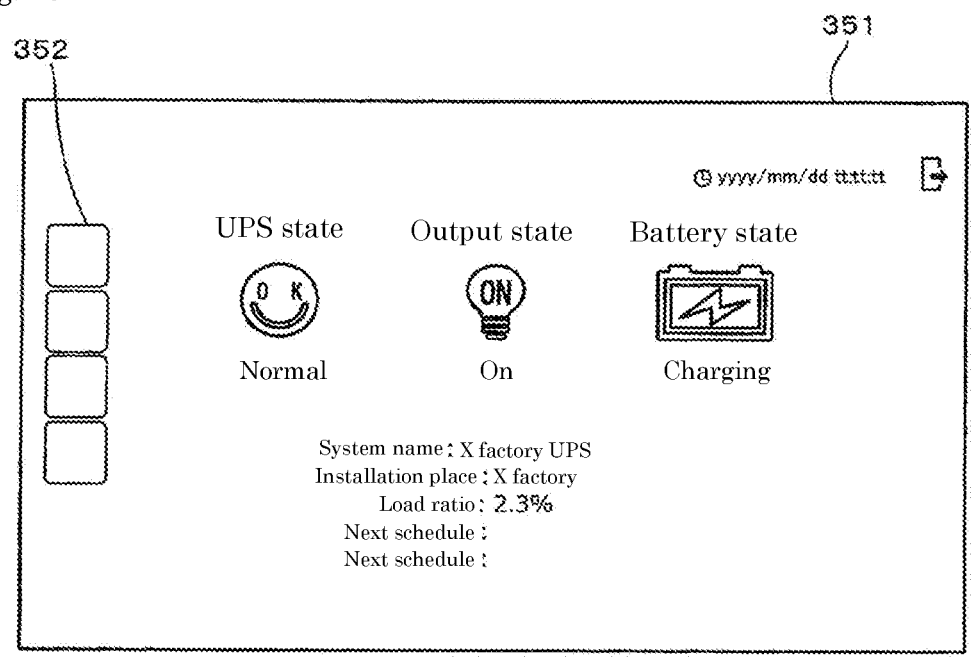
FIG. 20 is a diagram showing another example of the Web screen presented from the communication device.

FIG. 20 is a diagram showing another example of the Web screen presented from the communication device 1. FIG. 20 shows a new Web screen 351 provided by the Web server of the communication device 1 connected to the uninterruptible power system U. The information displayed on the Web screen 351 is output based on the Web screen data 14P individually stored for the uninterruptible power system (UPS) U. Login is also required to display the Web screen 351 provided from the communication device 1 shown in FIG. 20 on the client device 3. The login information is the same as the login to the Web server provided by the server device 2, whereby login is automatically performed and the login information is displayed without performing the operation of inputting the login information on the client device 3 again.

The communication device 1 provides the client device 3 with information obtained from the control unit of the connected uninterruptible power system U. As shown in FIG. 20, the Web screen 351 for displaying the information on the uninterruptible power system U on the client device 3 includes character information indicating an item of "UPS state" indicating the state of the device itself, an item of "output state" indicating ON or OFF of the device, and an item of "battery state" indicating the state of charge of the built-in battery. Then, as shown in FIG. 20, each item includes a pattern that visually shows the state. Specifically, the "UPS state" is associated with a "smile mark with a character design of OK", the "output state" is associated with a "light bulb" pattern, and the "battery state" is associated with a "battery" pattern. The pattern is made to change according to the state. For the "UPS state", if the state requires attention, the "smile mark" may change to the "exclamation mark", or if the state is an abnormal state, the shape may change, for example, to a triangular pattern that reminds attention. The color of the mark may also change from a cold color system such as green or blue to a warm color system such as yellow or red according to the state. As for the "output state", the pattern of the "light bulb" changes such that it becomes a character, color, or pattern that represents "lighting" in the ON state, and becomes a character, color, or motif that represents "lighting out" in the OFF state. As for the "state of charge", if the state is a full charge state, the number of rectangles included in the frame is the number that fills the frame, and if the state is a low charge state, the state of charge is displayed with one rectangle or the like so that it can be visually grasped. It is preferable that a pattern that indicates during charging, such as a lightning, be displayed during charging, and a pattern that reminds the discharge state, such as a motif with gradations on the top and bottom, be displayed during discharging.

The Web screen 351 includes a plurality of menu icons 352 for receiving an operation on the client device 3. Each of the plurality of menu icons 352 includes, for example, a menu for displaying various information including the above-described abnormality information obtained via the communication device 1. Also, the menu icon 352 includes a setting system menu for executing settings of the time on the communication device 1, notification email addresses, and the like, network settings, settings related to SSH or SNMP, and settings related to control via serial communication in the client device 3, or restart (shutdown) of the communication device 1. The setting system menu also includes a menu for setting a delay time when the uninterruptible power system U is automatically shut down. The menu icon 352 includes a control system menu for remotely shutting down (restarting) the uninterruptible power system U or testing the built-in battery. The menu icon 352 has different contents depending on the login information. The menu icon 352 of the Web screen 351 displayed by the login information having the maintenance personnel authority includes a setting menu such as firmware update processing and password setting.

Figure 21:
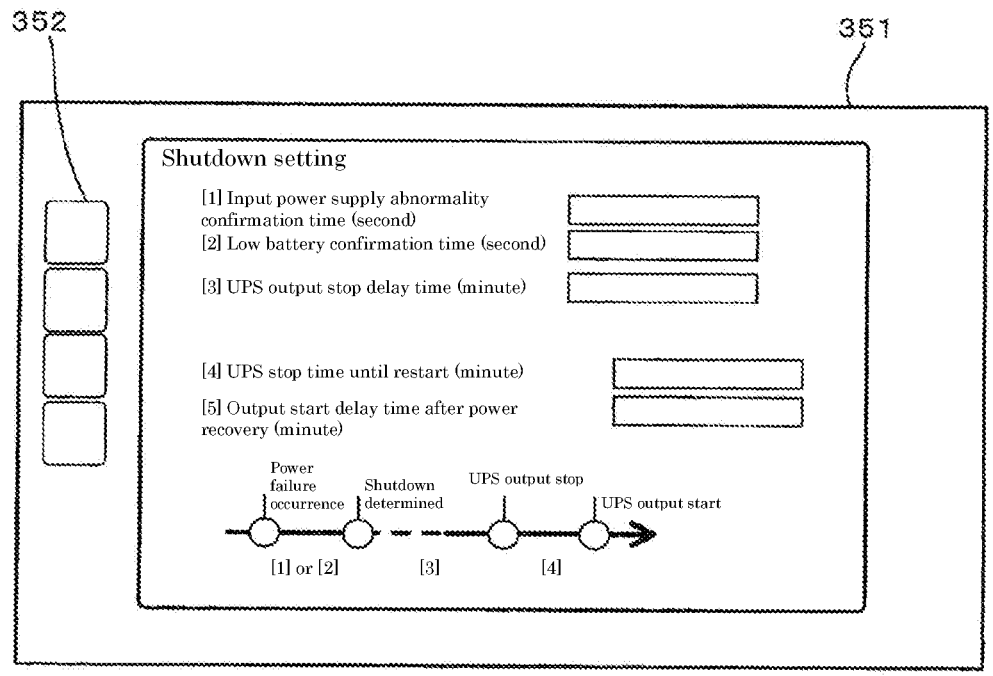
FIG. 21 is a diagram showing an example of the Web screen presented from the communication device.

FIG. 21 is a diagram showing an example of a Web screen presented from the communication device 1. FIG. 21 is an example of a screen displayed when the setting menu related to the automatic shutdown is selected from the menu icons 352 of FIG. 20. In order to make it easier to visually grasp the time to be set, an event that (should) occur on the time axis is displayed in the lower part using different colors or shapes depending on the content and state of the event.

Figure 22:
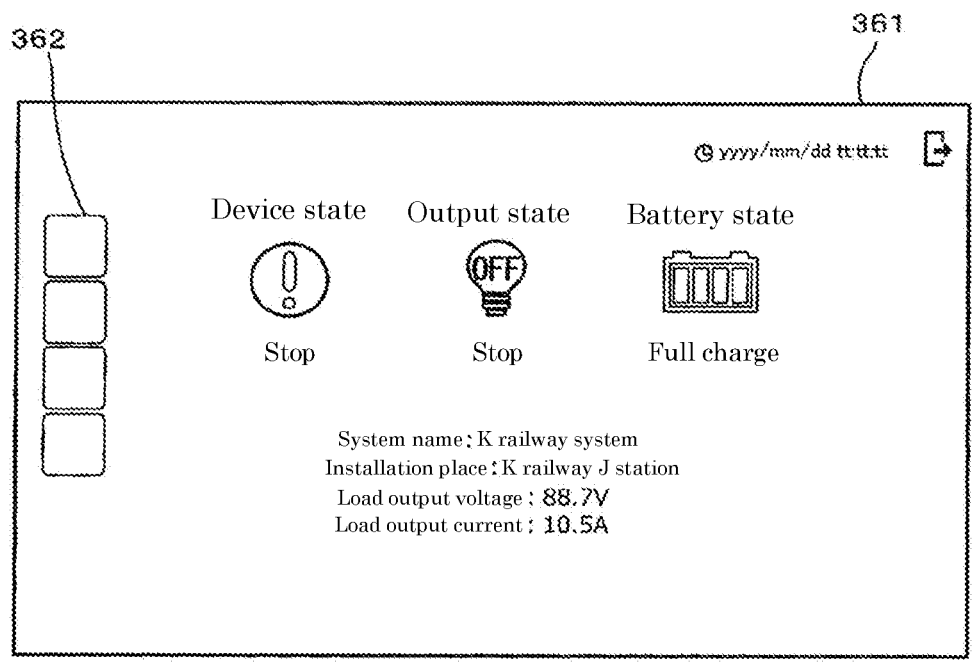
FIG. 22 is a diagram showing another example of the Web screen presented from the communication device.

FIG. 22 is a diagram showing another example of the Web screen presented from the communication device 1. FIG. 22 shows a new Web screen 361 provided by the Web server of the communication device 1 connected to the rectifier D. The information displayed on the Web screen 361 is output based on the Web screen data 14P individually stored for the rectifier D. Login is also required to display the Web screen 361 provided from the communication device 1 shown in FIG. 22 on the client device 3. The login information is the same as the login to the Web server provided by the server device 2, whereby login is automatically performed and the login information is displayed without performing the operation of inputting the login information again on the client device 3.

The communication device 1 provides the client device 3 with information obtained from the control unit of the connected uninterruptible power system U. As shown in FIG. 22, the Web screen 361 for displaying the information on the uninterruptible power system U includes character information indicating an item of "device state" indicating the state of the device itself, an item of "output state" indicating ON or OFF of the device, and an item of "battery state" indicating the state of charge of the auxiliary battery. Then, as shown in FIG. 17, each item includes a pattern that visually shows the state. Specifically, the "device state" is associated with an "exclamation mark" indicating an abnormal state or a state requiring attention, the "output state" is associated with a "light bulb" pattern, and the "battery state" is associated with a "battery" pattern. The pattern is made to change according to the state. For the "device state", the pattern may change to a "smile mark" in a normal state, and change to a "question mark" in an unknown state. The color of the mark may also change, for example, to a warm color system in the case of a state requiring attention or a warning state, and to a cold color system in the case of a normal state or a safe state. As for the "output state", the pattern of the "light bulb" changes to a character, color, or motif that represents "lighting" in the ON state, and to a character, color, or motif that represents "lighting out" in the OFF status. As for the "state of charge", if the state is a full charge state, the number of rectangles included in the frame is the number that fills the frame, and if the state is a low charge state, the state of charge is displayed with one rectangle or the like so that it can be visually grasped. It is preferable that a pattern that indicates during charging, such as a lightning, be displayed during charging, and a pattern that reminds the discharge state, such as a motif with gradations on the top and bottom, be displayed during discharging.

The Web screen 361 includes a plurality of menu icons 362 for receiving an operation on the client device 3. Each of the plurality of menu icons 362 includes, for example, a menu for displaying various information such as the above-mentioned abnormality information, the ON or OFF state of each rectifier unit in the rectifier D, the output voltage, the current, and the like, that are obtained via the communication device 1. The menu icon 362 includes a setting system menu for executing settings of the time on the communication device 1, notification email addresses, and the like, network settings, settings related to SSH or SNMP, and settings related to control via serial communication in the client device 3, or restart (shutdown) of the communication device 1. In addition, the menu icon 352 includes a control system menu for remotely shutting down (restarting) the rectifier D and testing the built-in battery. The menu icon 362 has different contents depending on the login information. The menu icon 362 of the Web screen 361 displayed by the login information having the maintenance personnel authority includes a setting menu such as firmware update processing and password setting.

Figure 23:
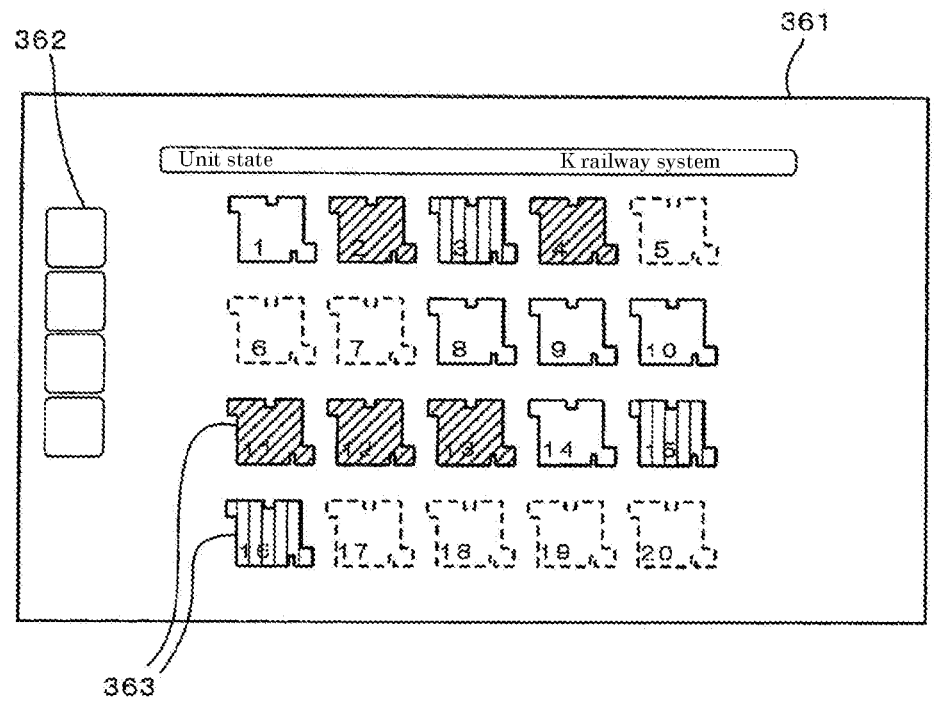
FIG. 23 is a diagram showing an example of the Web screen presented from the communication device.

FIG. 23 is a diagram showing an example of a Web screen presented from the communication device 1. FIG. 23 is an example of a screen displayed when a menu for showing detailed information, that is, detailed information on each of the built-in rectifier units is selected with the menu icon 362 of FIG. 22. When the detailed information menu for each rectifier unit is selected, icons 363 respectively corresponding to the plurality of built-in rectifier units are displayed. Identification information such as a number for identifying each rectifier unit is attached to each icon 363, and the display mode differs depending on the state of each rectifier unit. In FIG. 23, in the rectifier D having a maximum of twenty rectifier units, the rectifier units actually provided are shown by solid lines and the vacant units are shown by broken lines. Among the built-in rectifier units, the icon 363 corresponding to the operating (ON state) unit is displayed in plain color, and the icon 363 corresponding to the nonoperating unit is displayed in gray color. In the warning state and the state in which an abnormality is detected, the color of the icon 363 may be changed to yellow, red, or the like so that it can be easily grasped visually (the difference in color is shown by hatching in the figure). Each icon 363 is provided with a link to a screen showing individual detailed information (current value, voltage value, abnormality code in the case of a warning state or an abnormality detection state) on the corresponding rectifier unit, and when selected, the display is switched to display of detailed information on the rectifier unit in the screen 361.

By using the communication device 1 in this manner, it becomes possible for the client device 3 to access the Web page that presents information individually for each device with the server device 2 as a base in a mode different from the Web screen 330 (FIGS. 5 and 6) provided by the server device 2.

In FIGS. 11 and 17 to 23, examples of Web screens are shown in diagrams. The Web screen preferably displays the background color (background image) in different modes depending on the type of content to be displayed. For example, the Web screen 336 provided from the communication device 1 of the energy storage module group L is based on gray as the background color, and the characters and icons are painted white (white to light gray, beige, etc.). Gray may be gradation in the range of (R, G, B)=(80-130, 80-130, 80-130), for example. The Web screen 341 provided from the communication device 1 of the power conditioner P has a background color based on, for example, a navy blue color, and the colors of characters and icons are whitish like the energy storage module group L. Navy blue may have gradations in the range of (R, G, B)=(5-10, 30-65, 60-120), for example. The Web screen 351 provided from the communication device 1 of the uninterruptible power system U has a background color based on, for example, dark green, and the colors of characters and icons are whitish like the energy storage module group L. The dark blue color may be gradation in the range of (R, G, B)=(0-5, 50-160, 0-5), for example. The Web screen 361 provided from the communication device 1 of the rectifier D has a background color based on, for example, purple, and the colors of characters and icons are whitish like the energy storage module group L. Purple may be a gradation in the range of (R, G, B)=(80-100, 0-20, 100-150), for example.

In the present embodiment, by using the communication device 1 that can be universally mounted, as the network card type, not only to the energy storage module but also to the power conditioner P, the uninterruptible power system U, and the rectifier D, it is possible to acquire individual information on each device from the client device 3. Moreover, it is possible to connect to the communication device 1 by acquiring connection information from the server device 2 that collects information from each communication device 1. Web screens provided from the respective communication devices 1 include the common portion but are displayed in different modes depending on the type of information target. Therefore, even when individual information is displayed in a system that includes a large number of devices, the user or operator who uses the client device 3 can easily grasp visually information on which type of energy storage device or device is being displayed.

The example in which the energy storage module and the energy storage module group L are composed of a plurality of lithium ion battery cells has been described. Alternatively, the energy storage module and the energy storage module group L (or part of them) may be composed of a plurality of lead-acid batteries or capacitors.

Third Embodiment

Another embodiment will be described.

Figure 24:
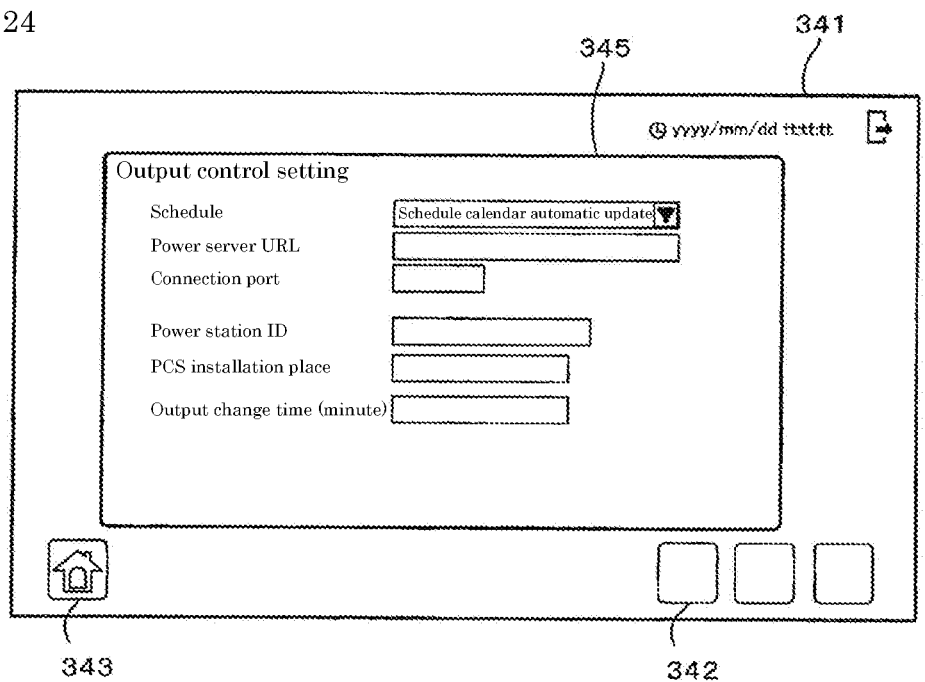
FIG. 24 is a diagram showing another example of the Web screen presented from the communication device.

FIG. 24 is a diagram showing another example of the Web screen presented from the communication device 1. FIG. 24 is an example of a screen displayed when the menu for setting the output control of the power conditioner P is selected with the menu icon 342 in FIG. 18. A screen 345 is displayed on the display unit 33 of the client device 3 so as to be superimposed on the Web screen 341 of FIG. 18. It may be switched within the Web screen 341. In the example shown in FIG. 24, the screen 345 is provided with columns for selecting the input method of the schedule and receiving input of the connection information (URL and port) of the power server of the cooperation destination. It is also possible to receive setting inputs such as the power plant ID and installation place. The setting of the output change time can be also received.

In this way, by using the communication device 1 that can also be universally mounted to the power conditioner P, it becomes possible to access the Web page that individually presents the information on the power conditioner P with the server device 2 as a base. The information presented on this Web page makes it possible to display not only the output states and abnormal states of the entire power conditioners P, but also the detailed information on each of the plurality of connected power conditioners P. Further, since this Web page functions as an interface for receiving exchange of control information, setting for cooperation with an external power server, control instruction operation by the operation unit 34 of the client device 3, and the like, dramatic improvement in efficiency of maintenance work by a user or maintenance personnel can be expected.

The example in which the energy storage module and the energy storage module group L are composed of a plurality of lithium ion battery cells has been described. Alternatively, the energy storage module and the energy storage module group L (or part of them) may be composed of a plurality of lead-acid batteries or capacitors.

The present embodiment is summarized below.

(1) A power conditioner having a communication unit that communicates with a first device and a second device, the power conditioner including:

a first transmission unit that, when having received a transmission request from the first device, transmits information including a device state obtained from the own device from the communication unit to the first device;

a storage unit that stores screen data for screen display;

a creation unit that, when having received a connection request from the second device, acquires information including a state of the own device, and creates, based on the screen data, display information for displaying a screen including the acquired information and receiving an operation on the screen; and a second transmission unit that transmits the created display information from the communication unit to the second device.

(2) The power conditioner according to (1), wherein the display information includes information for displaying an object corresponding to a power conditioner connected to itself, and the object includes information for displaying information on itself and a power conditioner connected to itself.

(3) The power conditioner according to (1) or (2), including a third transmission unit that creates control information based on an operation received on the screen and transmits it to a control unit that controls itself and a connected power conditioner.

(4) The power conditioner according to (3), which receives, on the screen, setting of output control schedule and setting of cooperation information with a power server on the screen.

(5) An information processing system including: a plurality of power conditioners each including a communication device; and an information processing device capable of communication connection with the communication device, wherein the communication device includes a first transmission unit that, when having received a transmission request from the information processing device, transmits information including a state obtained from a corresponding power conditioner to the information processing device, a storage unit that stores screen data for screen display, a creation unit that creates, in response to a request, display information for displaying information including a state obtained from the corresponding power conditioner based on the screen data, and a second transmission unit that transmits the created display information to a request source, and wherein the information processing device includes a request transmission unit that transmits a transmission request to the plurality of power conditioners, a storage processing unit that stores information transmitted from the communication device in response to the transmission request in a storage medium, and a transmission processing unit that transmits, in response to a request, to a request source, display information which is information for collectively displaying the information stored in the storage medium for each system including the power conditioner, or for each place where the power conditioner is installed, and which includes connection information to the communication device.

(6) A computer program for causing a computer including a display unit to receive and display information on a power conditioner, the computer program causing the computer to execute the steps of;

requesting a communication connection to a communication device connected to the power conditioner;

receiving, from the communication device, screen display information including a menu for displaying a state of the power conditioner and a menu for displaying a screen for receiving an operation for the power conditioner; and displaying a screen including state information of the power conditioner based on the received screen display information.

As another embodiment, the following configurations can be also realized. A computer program for causing a computer including a display unit to receive and display information on a power supply-related device, the computer program causing the computer to execute the steps of requesting a communication connection to a communication device connected to the power supply-related device; receiving, from the communication device, screen display information including a menu for displaying a state of the power supply-related device and a menu for displaying a screen for receiving an operation for the power supply-related device; and displaying a screen including state information of the power supply-related device based on the received screen display information.

The power supply-related device may be any one or more of a power conditioner, an uninterruptible power system, a rectifier for converting, for example, alternating current into direct current or alternating current with different characteristics. The power supply-related device is preferably electrically connected to the energy storage device.

The power supply-related device includes an energy storage device (lithium ion battery or lead-acid battery) and a battery management device in addition to the communication device 1, and may transmit display information for collectively displaying information on the power supply-related device and information on the energy storage device. The power supply-related device may remotely receive an instruction or setting for controlling the mounted energy storage device through the battery management device.

The invention claimed is:

1. An information processing device that transmits information on a plurality of energy storage devices and a power supply-related device in response to a request from an outside or as an event, the information processing device comprising:

a controller that is configured to acquire information including a state of the plurality of energy storage devices and the power supply-related device through communication by at least a communication device provided in each of the plurality of energy storage devices and the power supply-related device;

a storage processing unit that is configured to store the acquired information in a storage medium in association with information that is configured to identify the plurality of energy storage devices and the power supply-related device, respectively; and a transmission processing unit that is configured to transmit display information for collectively displaying, through a screen including images, the information on the plurality of energy storage devices and the power supply-related device stored in the storage medium for each system including the plurality of energy storage devices and the power supply-related device, or for each place where the plurality of energy storage devices and the power supply-related device are installed, wherein the transmission processing unit is configured to transmit the display information that collectively displays pictorially the information including the state, connections, locations, and abnormality of the plurality of energy storage devices and the power supply-related device.

2. The information processing device according to claim 1, wherein an energy storage device from among the plurality of energy storage devices is configured by connecting a plurality of modules each including a plurality of energy storage cells, and the display information is information for displaying information in a hierarchical manner based on a connection configuration of the energy storage device.

3. The information processing device according to claim 2, wherein the energy storage device is configured by connecting in parallel banks each obtained by connecting in series the plurality of modules each including the plurality of energy storage cells.

4. The information processing device according to claim 2, wherein with respect to the energy storage device, information is displayed in order of a module from among the plurality of modules and an energy storage cell from among the plurality of energy storage cells according to a selection.

5. The information processing device according to claim 1, wherein the display information includes connection information of each of the plurality of energy storage devices and the power supply-related device for collective display on the screen to the communication device provided in each of the plurality of energy storage devices and the power supply-related device.

6. The information processing device according to claim 1, wherein the power supply-related device comprises at least one of a power conditioner, an uninterrupted power supply, and a rectifier.

7. The information processing device according to claim 1, wherein the information on the plurality of energy storage devices and the power supply-related device stored in the storage medium for each system is collectively displayed and linked for each place where the plurality of energy storage devices and the power supply-related device are installed.

8. The information processing device according to claim 1, wherein the display information is transmitted as a Web page to collectively display the information on the plurality of energy storage devices and the power supply-related device stored in the storage medium for each system.

9. The information processing device according to claim 1, wherein the transmission processing unit sends to a client device a Web page that includes a hierarchical structure of a selected group of the plurality of energy storage devices determined by the controller via a selected link.

10. The information processing device according to claim 9, wherein the Web page collectively acquires and displays the plurality of energy storage devices and the power supply-related device included in a selected system determined by the controller.

11. An information processing method, in which an information processing device transmits information on a plurality of energy storage devices and a power supply-related device in response to a request or as an event, the information processing method comprising:
   acquiring information including a state of the plurality of energy storage devices and the power supply-related device, respectively, through communication by using a plurality of communication devices provided in the plurality of energy storage devices and the power supply-related device;
   storing, in a storage medium, the acquired information in association with information configured to identify the plurality of energy storage devices and the power supply-related device, respectively; and
   transmitting display information for collectively displaying, through a screen including images, the information on the plurality of energy storage devices and the power supply-related device stored in the storage medium for each system including the plurality of energy storage devices and the power supply-related device, or for each place where the plurality of energy storage devices and the power supply-related device are installed,
   wherein the transmitting comprises to transmit the display information that collectively displays pictorially the information including the state, connections, location, and abnormality of the plurality of energy storage devices and the power supply-related device.

12. The information processing method according to claim 11, wherein the power supply-related device comprises at least one of a power conditioner, an uninterrupted power supply, and a rectifier.

13. A computer program, stored in a non-transitory computer readable medium, for causing a computer including a display unit to display information on a plurality of energy storage devices and a power supply-related device, the computer program causing the computer to execute:
   requesting information on the plurality of energy storage devices and the power supply-related device for each system including the plurality of energy storage devices and the power supply-related device, or for each place where the plurality of energy storage devices and the power supply-related device are installed;
   receiving the requested information through communication by at least a communication device provided in each of the plurality of energy storage devices and the power supply-related device;
   storing, in a storage medium, the received information in association with information configured to identify the plurality of energy storage devices and the power supply-related device, respectively; and
   collectively displaying, through a screen including images, the information on the plurality of energy storage devices and the power supply-related device stored in the storage medium, transmitted in response to the requested information, for each system or for each place where the plurality of energy storage devices and the power supply-related device are installed,
   wherein the screen collectively displays pictorially the information including the state, connections, location, and abnormality of the plurality of energy storage devices and the power supply-related device.

14. The computer program according to claim 13, wherein the power supply-related device comprises at least one of a power conditioner, an uninterrupted power supply, and a rectifier.

15. An information processing system comprising: a plurality of communication devices connected to an energy storage device and a power supply-related device; and an information processing device that transmits and receives information to and from the plurality of communication devices, wherein
   each of the plurality of communication devices includes
   a first transmission unit that is configured to, when having received a transmission request from the information processing device, transmit information including a state obtained from the connected energy storage device or the power supply-related device to the information processing device,
   a storage unit that is configured to store screen data for screen display, having a common portion that is common regardless of a type of the connected energy storage device or power supply-related device, and a unique portion that differs depending on the type of the connected energy storage device or power supply-related device, a processor that is configured to create display information of the connected energy storage device or the power supply-related device for displaying a screen based on the screen data of the connected energy storage device or the power supply-related device, and a second transmission unit that is configured to transmit the created display information to a communication terminal device.

16. The information processing system according to claim 15, wherein a communication device from among the plurality of communication devices includes an execution unit that is configured to execute a Web server program corresponding to a Web browser of the communication terminal device, and Web page information is created as the display information.

17. The information processing system according to claim 16, wherein the communication device stores, in the storage unit, a communication program for external cooperation, which differs depending on the type of the connected energy storage device or power supply-related device, and receives a communication connection based on a protocol from the communication terminal device.

18. The information processing system according to claim 15, wherein the information processing device receives a life prediction request for the energy storage device, and transmits a life prediction processing result corresponding to a request from the communication terminal device.

19. The information processing system according to claim 15, wherein the storage unit comprising a non-volatile memory.

20. The information processing system according to claim 15, wherein the power supply-related device comprises at least one of a power conditioner, an uninterrupted power supply, and a rectifier.

21. The information processing system according to claim 15, further comprising:

a server including the information processing device, the server being connected via a network to a client device and a communication device;

the communication device comprising the first transmission unit, the storage unit, the processor and the second transmission unit; and the client device comprising the communication terminal device including the screen display displaying the screen for the collective display.

* * * * *